United States Patent [19]

Mrugala et al.

[11] Patent Number: 4,903,935
[45] Date of Patent: Feb. 27, 1990

[54] BOTTLED WATER COOLER WITH IMPROVED VALVE CONSTRUCTION

[75] Inventors: Ronald J. Mrugala, Rockford; Doyle Raymer, Davis; Dipak J. Negandhi, Freeport, all of Ill.; Robert L. Latzko, Wauwatosa, Wis.

[73] Assignee: King-Seeley Thermos Company, Prospect Heights, Ill.

[21] Appl. No.: 175,925

[22] Filed: Mar. 31, 1988

[51] Int. Cl.⁴ .............................................. F16K 7/06
[52] U.S. Cl. ........................................... 251/9; 251/4
[58] Field of Search ........................................ 251/4, 9

[56] References Cited

U.S. PATENT DOCUMENTS

| | | | |
|---|---|---|---|
| 2,112,625 | 3/1938 | Jackson | 251/9 |
| 2,113,022 | 4/1938 | Hefti | 251/9 X |
| 2,291,267 | 7/1942 | Weiner | 251/9 X |
| 3,539,081 | 11/1970 | Norton et al. | 251/9 X |
| 3,638,681 | 2/1972 | Moore et al. | 251/9 X |
| 4,428,745 | 1/1984 | Williams | 251/4 X |

Primary Examiner—A. Michael Chambers
Assistant Examiner—John C. Fox
Attorney, Agent, or Firm—Harness, Dickey & Pierce

[57] ABSTRACT

The improved valve construction provides low force actuation and is therefore suitable in applications where children and handicapped persons may need to operate the valves. The pinch-type valve employs a lever arm pilot which supports a section of tubing in the fluid dispensing circuit. The lever arm is snap fit onto a valve plate and is adapted for rocking movement about a pivot point at one end of the lever arm. A valve cage supports a compression spring which applies a force upon the lever arm tending to depress the lever arm and its associated tube pinching valve seat into pinching contact with the tube. A force applied to the lever arm opposite the pivot point relieves the pinching force and the tube is thus opened for dispensing. An alternate flapper-type valve employs a valve pad encapsulated on the end of a lever arm which is in turn encapsulated in an O-ring seal so that the valve pad is situated at the center of the O-ring and the lever arm is disposed along a radial of the O-ring. The O-ring, lever arm and valve pad assembly is placed in a valve body which provides an inlet and outlet port, the inlet port having a serpentine bend to absorb turbulent shock. A spring is positioned behind the valve pad to hold it in the seated and closed position.

12 Claims, 23 Drawing Sheets

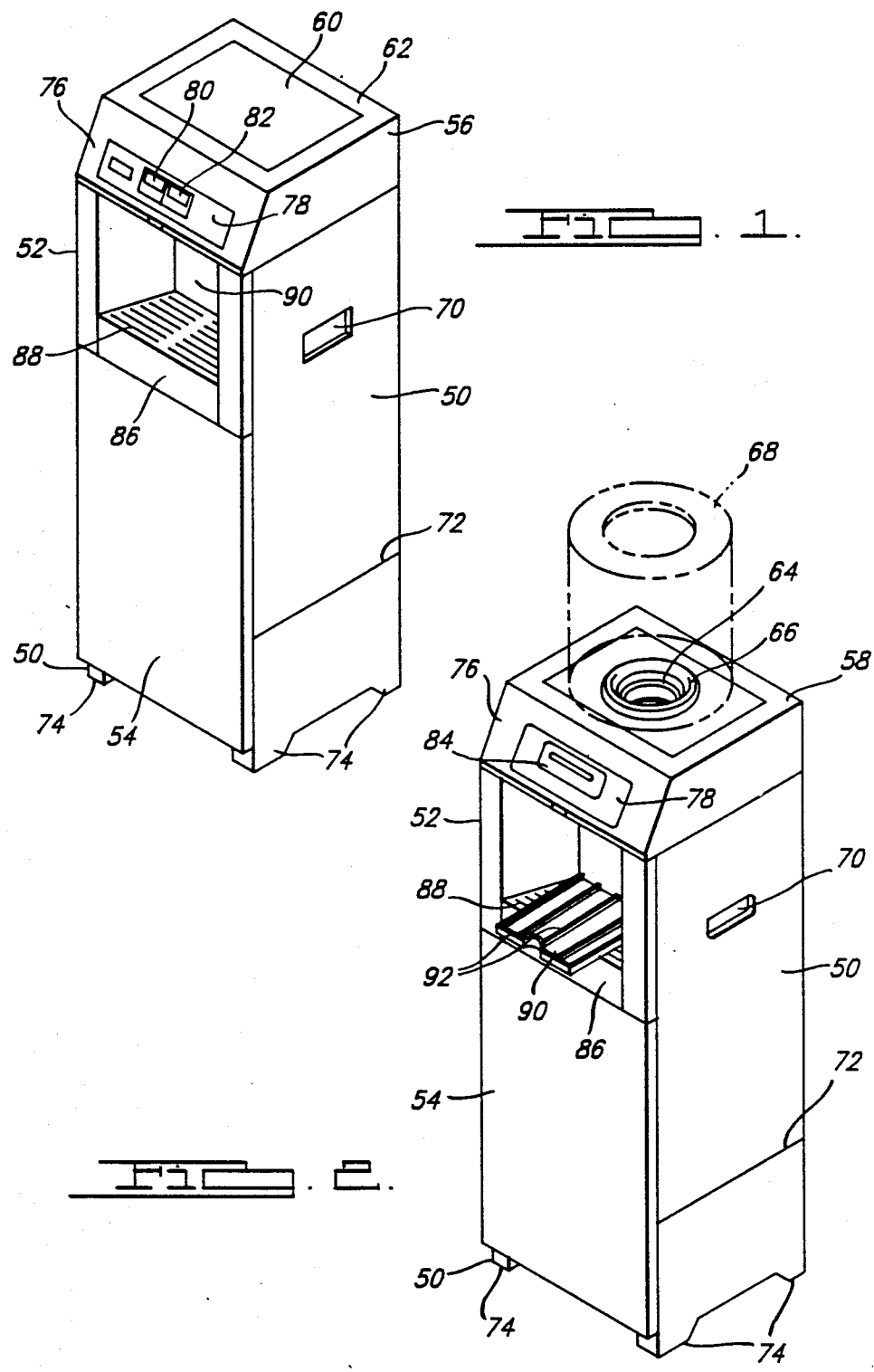

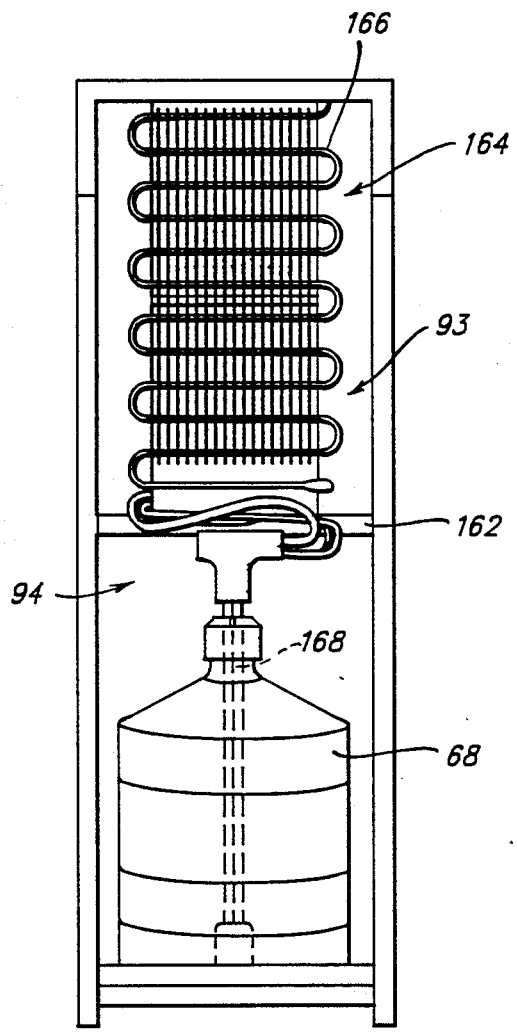

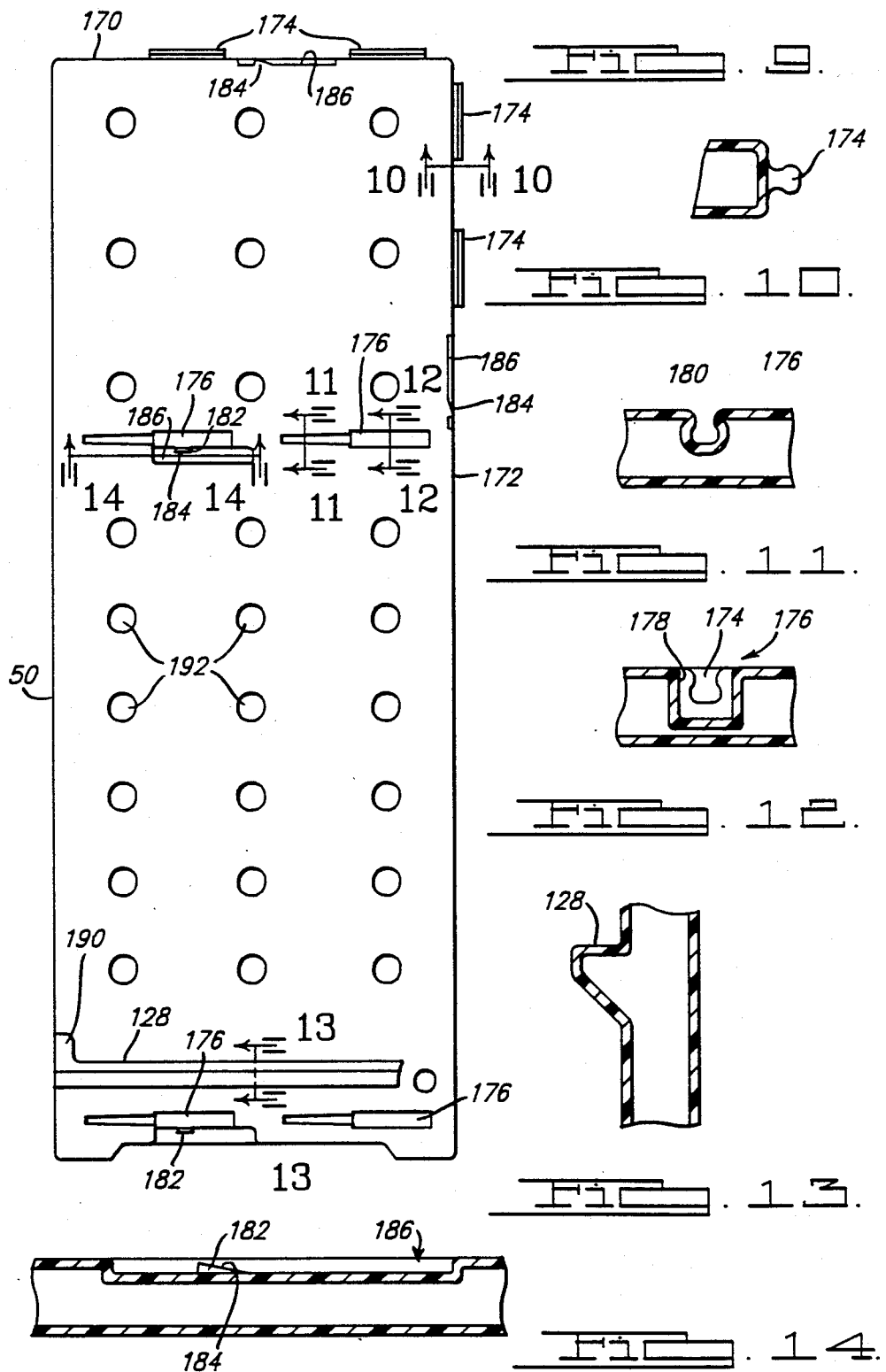

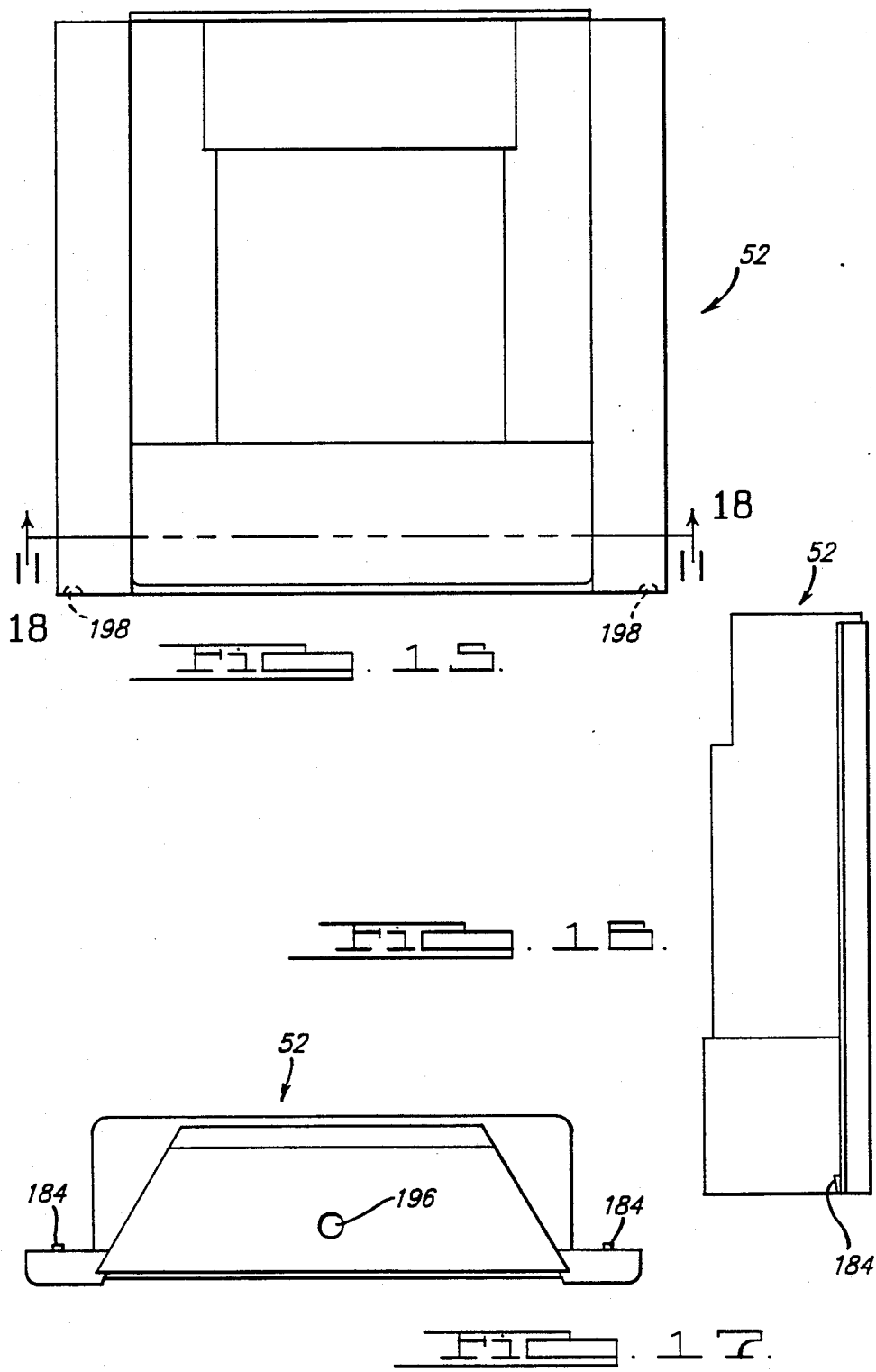

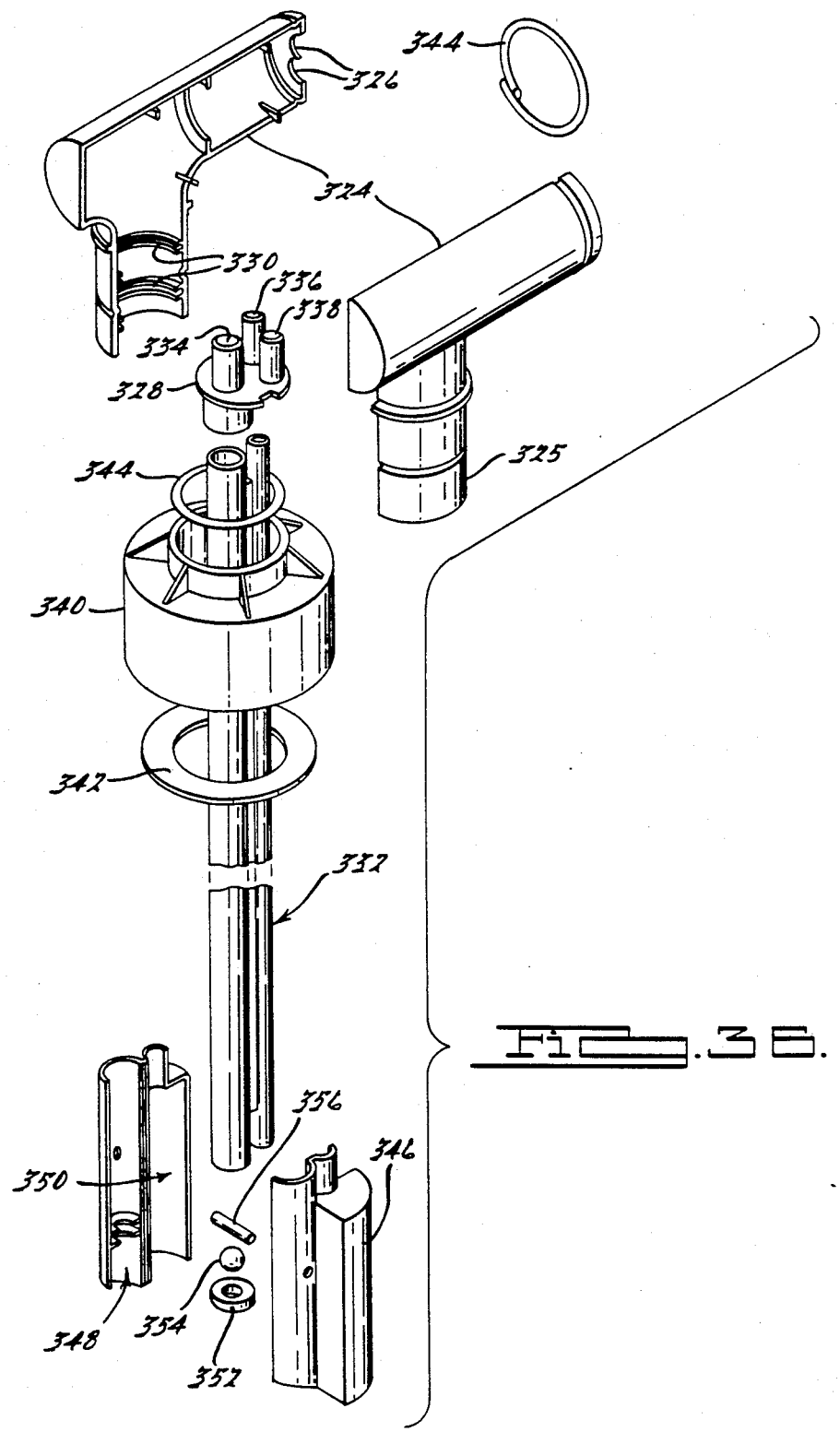

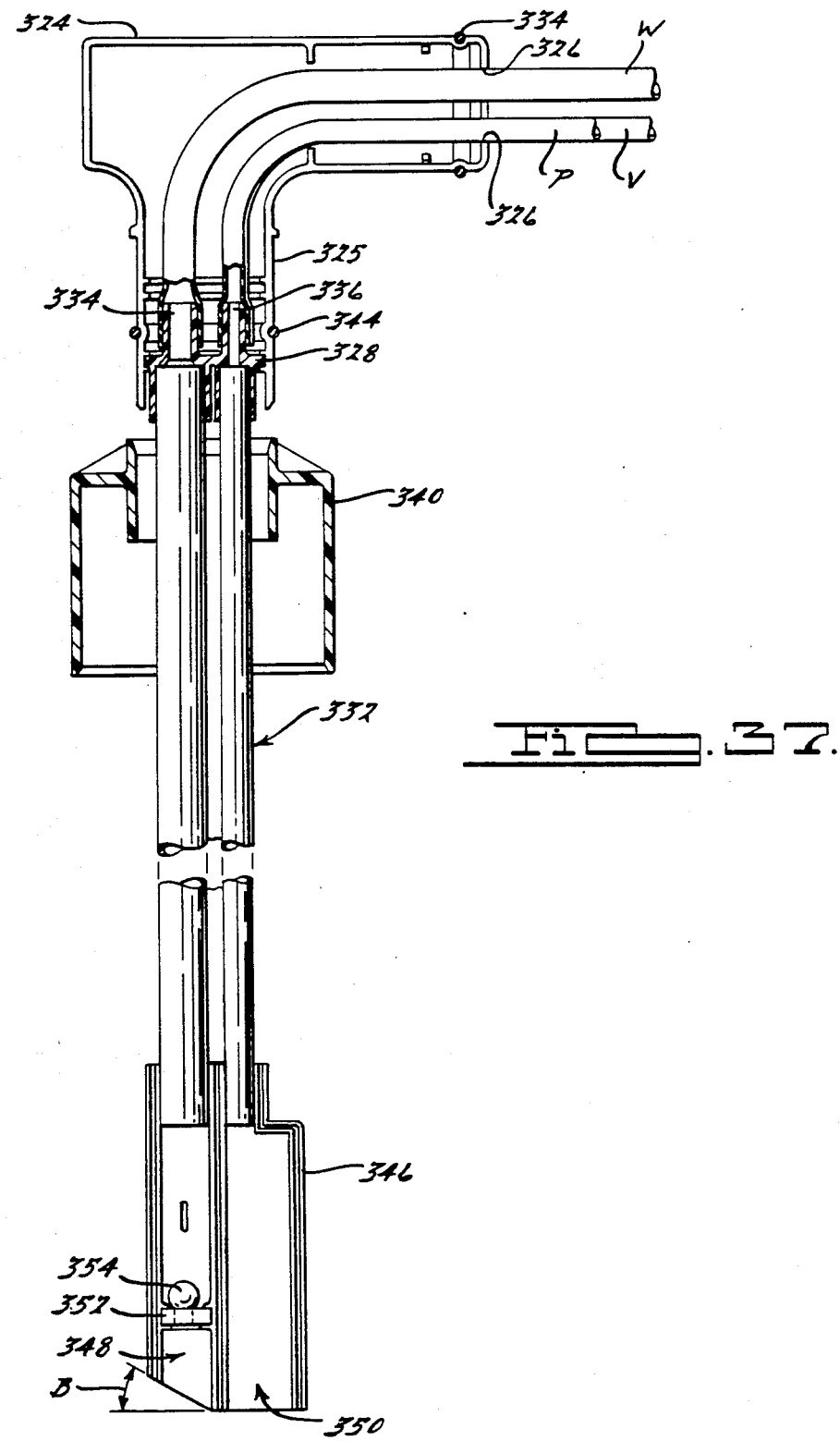

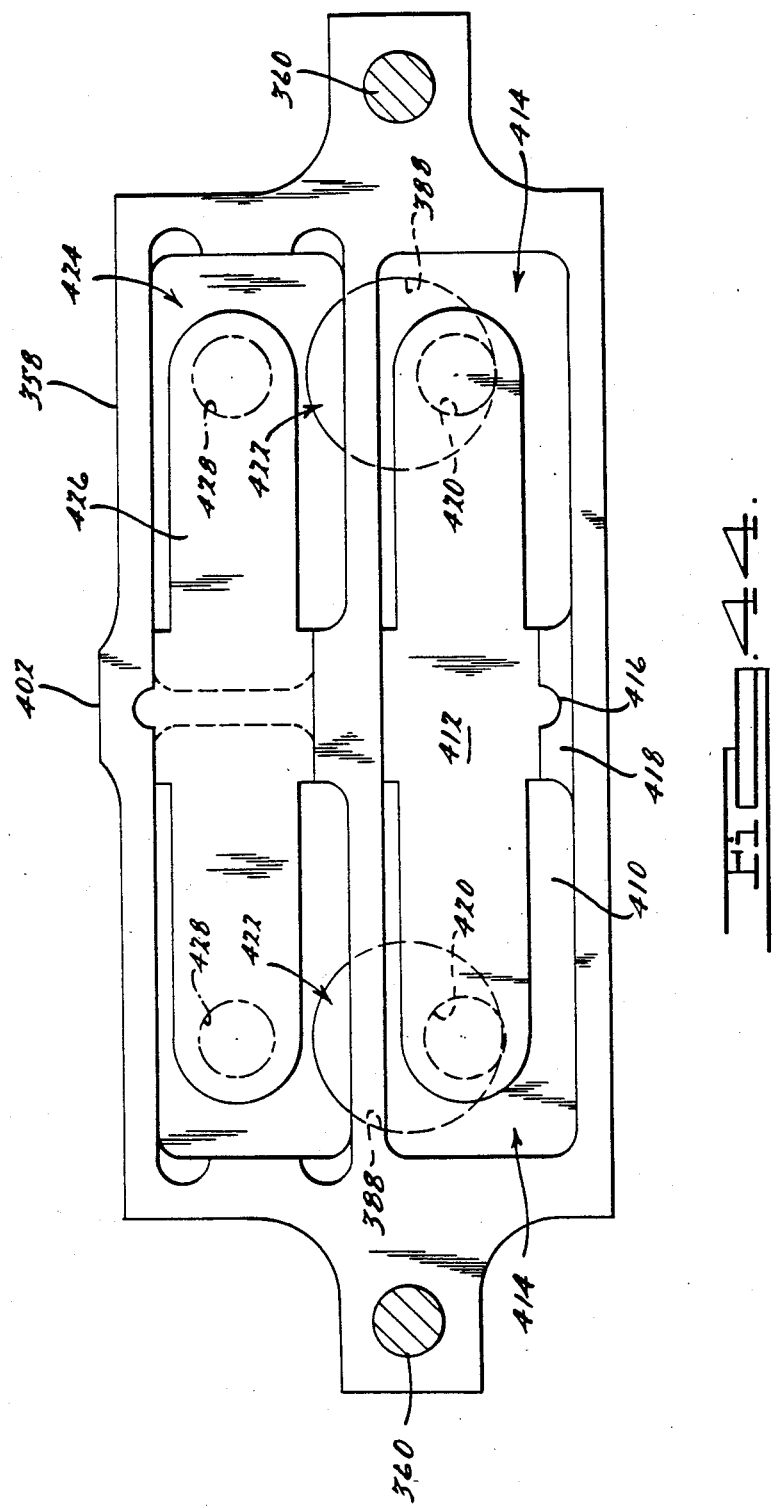

BOTTLED WATER COOLER WITH IMPROVED VALVE CONSTRUCTION

BACKGROUND AND SUMMARY OF THE INVENTION

The present relates generally to water coolers and more particularly to an improved valve construction for use in bottled water coolers, drinking fountains and beverage dispensing fountains.

Conventional bottled water coolers usually employ dispensing faucets which have built-in push button actuated valves. The conventional faucet and valve combination typically comprises a downwardly dispensing faucet having an annular valve seat around the periphery of the dispensing port. A valve pad of plastic seals the port when firmly pressed against the valve seat. Conventionally, a metal linkage rod connects the valve pad with a spring-loaded push button disposed on the top of the faucet assembly. The metal linkage is therefore in contact with the water being dispensed and can impart an unwanted taste to the water. In order to ensure that the faucet does not drip, a fairly strong compression spring is required. The compression spring acts through the linkage to press the valve pad firmly onto the valve seat. The resulting valve and faucet assembly therefore requires a considerable degree of force in order to operate, making it unsuitable for use by children or by the handicapped.

Other types of valves may be employed in bottled water cooler, drinking fountain and beverage dispensing applications, although the need for a fairly strong valve spring is a frequently encountered problem, as is the problem of unwanted imparted taste due to the presence of metals and like materials. Metal components are undesirable because they can corrode, they do not readily resist the buildup of mineral deposits, and they can react with other ions in the water.

The present invention provides an economical plastic valve which offers a low actuation force suitable for use by children and handicapped and which does not expose the water to metals or other materials which impart an unwanted taste to the water.

In one embodiment of the invention the low force actuation valve conveys water through a continuous length of tubing. The tubing is supported in a lever arm structure having pilot holes for holding the tubing. The lever arm is snap fit in a valve plate for pivotal movement about a fulcrum point at one end of the lever arm. A bias spring held in place by a plastic spring cage secured to the plate presses the lever arm into contact with the tubing and a wedge-shaped seat area on the lever arm pinches off or occludes the tubing by pressing it into a similar wedge-shaped seat are on the valve plate.

A limit switch supporting mounting bracket may be optionally secured to the spring cage. The mounting bracket holds a limit switch with switch button located so that valve opening movement of the lever arm depresses the limit switch button to actuate the switch.

In another embodiment of the invention a valve pad is encapsulated onto a plastic or rubber coated metal lever arm which is in turn positioned along a radial line of an O-ring seal. The valve pad is positioned at the center of the O-ring seal with the lever arm passing through and eextending radially beyond the O-ring seal by being encapsulated through it. The O-ring seal with associated lever and valve pad assembly is mounted in a valve body with the lever arm extending outwardly. Application of a transverse force upon the lever ar lifts the valve pad away from the valve seat against a spring bias provided by a compression spring disposed in the valve cover. The inlet port includes a serpentine bend which absorbs the turbulent shock force of the incoming water. By breaking the shock force before the water reaches the valve pad, a lighter valve spring can be employed for a more suitable low force actuating valve.

For a more complete understanding of the invention, its objects and advantages, reference may be had to the following specification and to the accompanying drawings.

BRIEF DESCRIPTION OF THE DRAWINGS

FIG. 1 is a perspective view of one embodiment of the invention, illustrating a dual push button configuration for lower mounted bottle;

FIG. 2 is a perspective view of another embodiment of the invention, illustrating a single push button embodiment of an upper mounted bottle configuration;

FIG. 8 is a rear elevational view of the lower mounted bottle embodiment of FIG. 1;

FIG. 9 is an inside elevational view of the right side panel from which the cabinet is assembled;

FIG. 10 is a cross-sectional view substantially along the line 10—10 of FIG. 9 showing a locking tab;

FIG. 11 is a cross-sectional view substantially along the line 11—11 of FIG. 9 showing a slotted aperture;

FIG. 12 is a cross-sectional view substantially along the line 12—12 of FIG. 9 and showing the relative size relationship of a locking tab by which the cabinet members are joined;

FIG. 13 is a cross-sectional view substantially along the line 13—13 of FIG. 9 showing a bottle carriage roller surface;

FIG. 14 is a cross-sectional view substantially along the line 14—14 of FIG. 9 showing a locking ramp;

FIG. 15 is a front plan view of the upper front module from which the presently preferred cabinet is assembled;

FIG. 16 is a side view of the module of FIG. 15;

FIG. 17 is a top plan view of the upper front module of

FIG. 23 depicts the presently preferred hinge plate;

FIG. 24 is a cross-sectional view of the hinge late of FIG. 23. taken substantially along the line 24—24;

FIG. 25 is a cross-sectional view of the hinge plate taken substantially along the line 25—25 of FIG. 23;

FIG. 36 is an exploded perspective view of one embodiment of a wand apparatus in accordance with the invention;

FIG. 37 is a cross-sectional view of the wand apparatus of FIG. 36;

FIG. 38 is a detailed view of the dual parallel condenser coil used in the refrigeration system of the plumbing module;

FIG. 44 is a horizontal sectional view of the pump.

DESCRIPTION OF THE PREFERRED EMBODIMENTS

Figure 3:
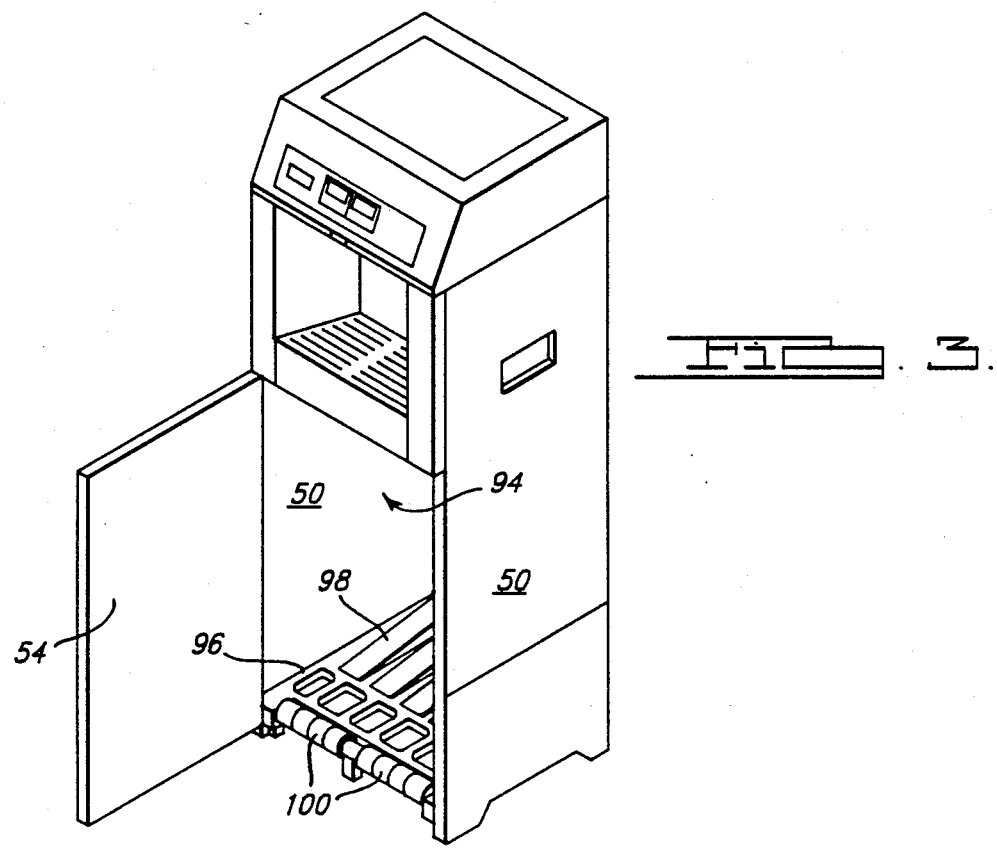
FIG. 3 is a perspective view of the embodiment of FIG. 1. showing the front panel access door open to reveal the interior bottle compartment.

The presently preferred bottled water cooler is fabricated using a modular construction for providing both an enclosed, lower mounted bottle configuration (FIG. 1) and an exposed, upper mounted bottle configuration (FIG. 2). The cabinet construction of both configurations comprises a pair of side panels 50, an upper front module 52, a lower door panel 54 and a top module. If desired, the side panels and lower door panel can be of different heights in the different configurations. The top module 56 of the lower mounted bottle configuration has a generally horizontal, flat, recessed top 60 on which articles such as cups and the like can be placed. The outer periphery 62 is raised to contain spills and to prevent articles from sliding or rolling off. The top module 58 of the upper mounted bottle configuration (FIG. 2) has a bottleneck receiving aperture 64 with a raised annular portion 66 on which the inverted water bottle 68 rests as illustrated.

The side panels 50 are formed with handle recesses 70 and if desired, the side panels can be provided with recessed or embossed design lines such as design line 72 to give the cabinet a more attractive appearance. Preferably the side panels are formed to include downwardly extending feet 74 as illustrated.

The top module of both configurations is generally rectangular with a sloping or inclined front panel 76 on which a push button retaining bezel 78 is mounted. The embodiment of FIG. 1 is illustrated with dual push buttons 80 and 82 for manual activation of hot and cold water, respectively. If desired, the hot button 80 can be used in an alternate configuration to dispense water at room temperature for use in cooking. The embodiment of FIG. 2 is depicted using a single push button 84 for dispensing water of a single temperature. It will be understood that both configurations of FIG. 1 and FIG. 2 could be implemented using either single or double push buttons, depending upon the desired result.

Disposed in the upper front module 52 is a removable drip tray 86 which includes a horizontally disposed grate 88 and a fold down tray 90 which may be used to support larger vessels while filling. In FIG. 1 the fold down tray 90 is shown in the folded up or stored position, whereas in FIG. 2 the fold down tray 90 is shown in the folded down position of use. As shown in FIG. 2, the fold down tray includes a plurality of ribs 92. including ribs which enclose the periphery of the tray. These ribs support a vessel above the underlying surface of the tray to permit any drips caught by tray 90 to freely flow beneath the vessel resting thereon. As more fully shown in FIG. 7, the fold down tray is adapted to drain into the drip tray 86. Preferably fold down tray 90 is hingedly attached to drip tray 86, so that both can be removed as a unit for cleaning.

Referring to FIG. 3, the embodiment of FIG. 1 is shown with lower door panel 54 open to reveal the lower interior compartment 94. At the base of lower interior compartment 94 is base member 96 which is attached to the side panels in a fashion described below. Base member 96 is provided with an inclined plane defining member 98 in the form of parallel inclined ribs and supports pairs of rollers 100 which are journaled for rotation about a horizontal axis to facilitate loading of the water bottle into compartment 94.

Figure 4:
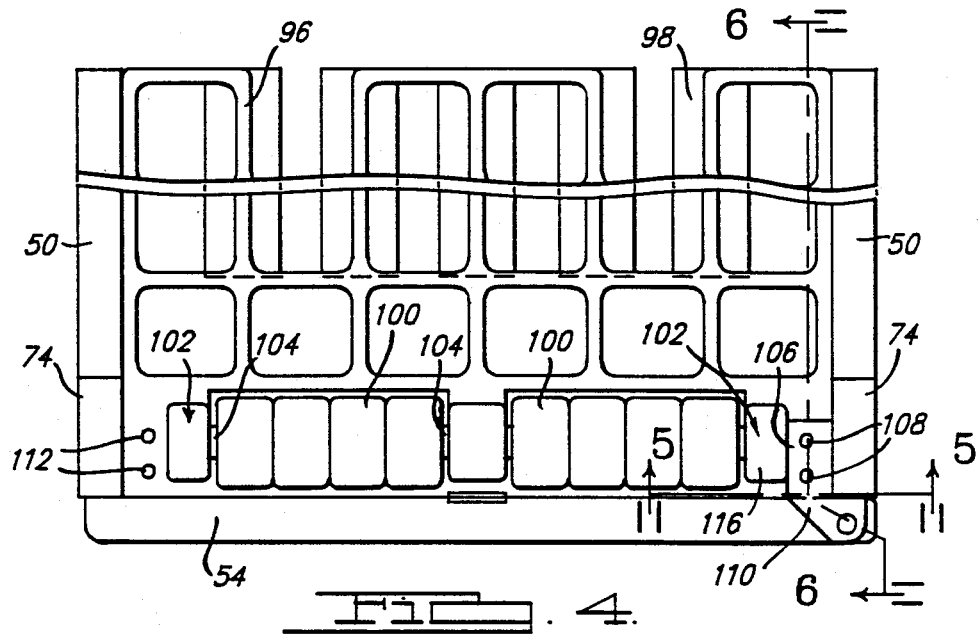
FIG. 4 is a view from the underside of the embodiment of FIG. 3, illustrating the bottle loading roller structure in greater detail.

FIG. 4 illustrates rollers 100 and the associated journals 102 and axles 104. FIG. 4 is a view from the underside of the cabinet and thus reveals hinge plate 106 which is attached to base member 96 with suitable fasteners through apertures 108. Hinge plate 106 provides an outwardly extending portion 110 which forms a portion of the pivot pintle to which lower door panel 54 is hinged. As illustrated, base member 96 has a second pair of apertures 112 for fastening hinge plate 106 to the opposite side of the cabinet in order to reverse the way the hinged door panel 54 swings.

Figure 6:
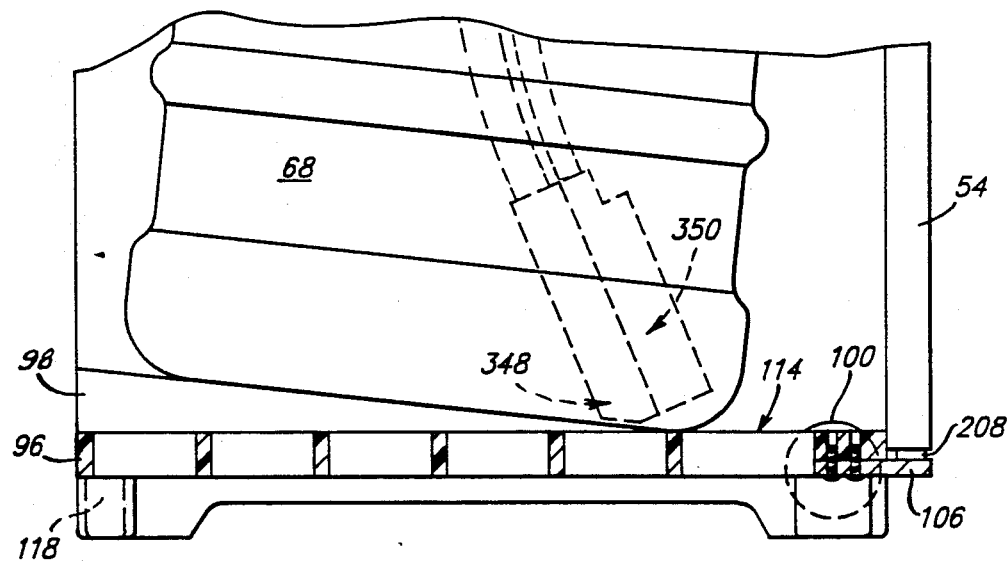
FIG. 6 is a fragmentary side cross-sectional view illustrating still further details of the roller and of the inclined position of the bottle in use.

As seen in FIG. 6, rollers 100 extend slightly above the upper frontal plane 114 of base member 96. This facilitates loading the bottle by allowing the user to tilt the bottle towards the user while it is resting on the floor in front of the cabinet, to slide the bottle toward the roller until the corner rests on the roller and then to push the bottle into the interior compartment 94 allowing the roller to bear the bulk of the bottle weight. As the bottle is pushed into the interior it slides onto the inclined plane defining member 98 as illustrated in FIG. 6.

Figure 5:
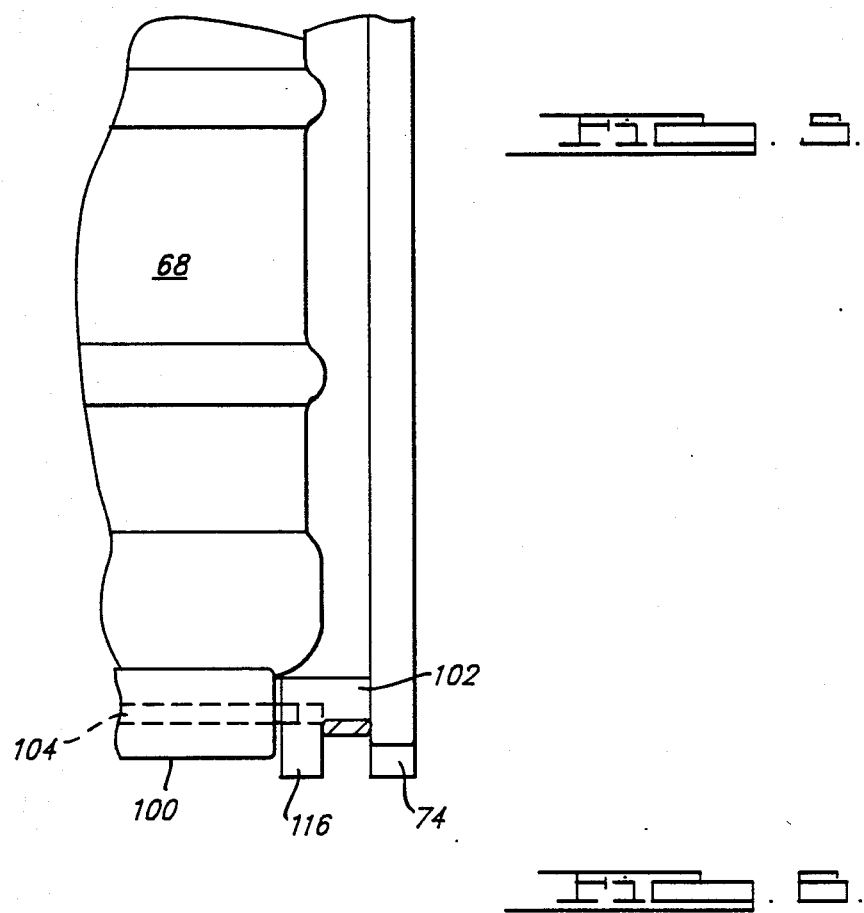
FIG. 5 is a fragmentary cross-sectional view illustrating further details of the roller of FIGS. 3 and 4.

FIG. 5 also shows the journals 102 which support the axles 104 on which rollers 100 turn. Journals 102 are provided with feet 116 which rest upon the floor as do feet 74. These additional feet 116 help support the load placed upon the rollers during bottle loading, thereby allowing side panels 50 to be fabricated from thinner stock. If desired, base member 96 can also be provided with a foot structure 118 to help support the weight of the bottle 68.

Figure 7:
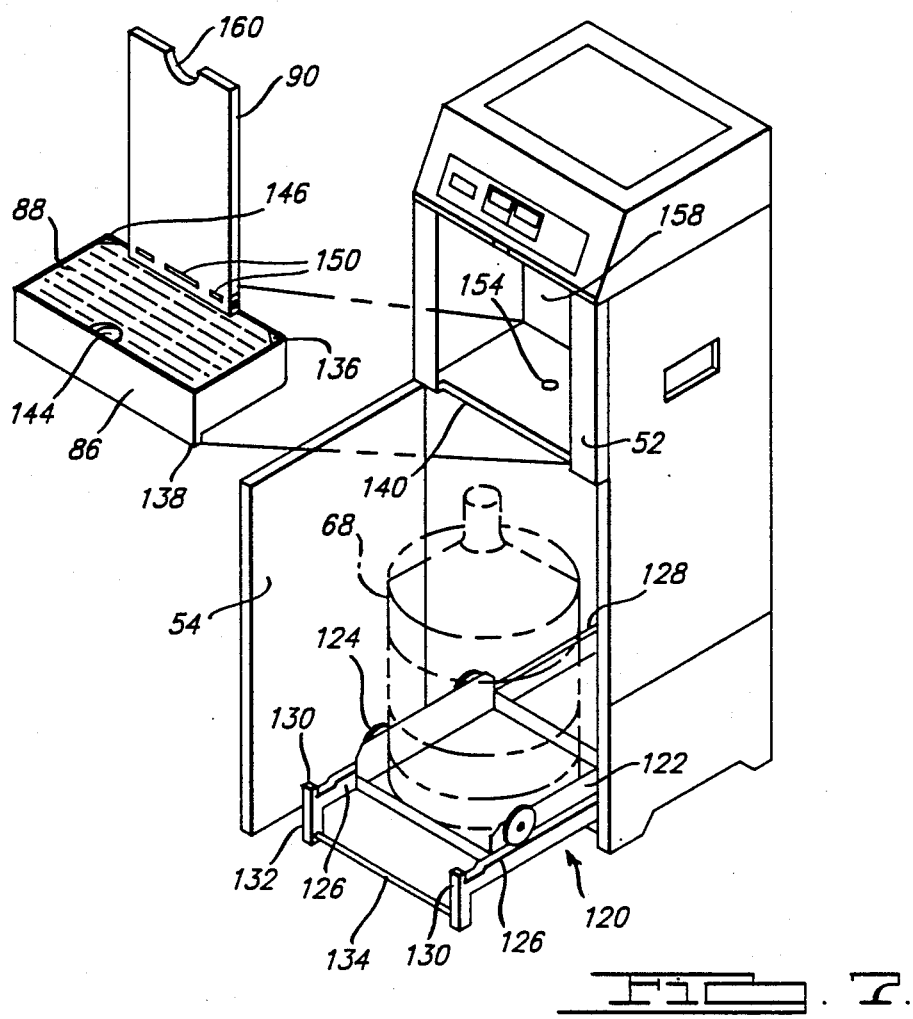
FIG. 7 is a perspective view of an alternate bottle loading system and further illustrating the drip tray removed from the cabinet showing upper drip tray in the stored position.

While the roller structure is simple and effective in operation, alternate bottle loading structures can be employed. As shown in FIG. 7, another possible loading mechanism is the fold down roller track 120. The bottle 68 rests upon a carriage 122 having wheels 124 which roll upon a track defined in part by fold down rails 126 and in part by internal rails 128 which are formed on the interior walls of side panels 50. The base of the carriage upon which the bottle rests may include an inclined plane defining member. Preferably the fold down rails 126 form a rigid structure connected for pivotal rotation about a horizontal axis passing through the front lowermost region of side panels 50 Rails 126 terminate at wheel stops 130 which also downwardly extend to define a pair of feet 132 for supporting the rails in a horizontal configuration aligned with internal rails 128.

When carriage 122 is rolled forwardly, the bottle 68 may be placed on the carriage and then rolled with ease into the lower interior compartment. Thereafter, the entire fold down roller track 120 is lifted with a pivotal movement into a generally vertical position which permits lower door panel 54 to be closed. A dowel 134 is provided for roller track stability and to manually grasp to pivotally raise and lower the fold down roller track 120.

Figure 7A:
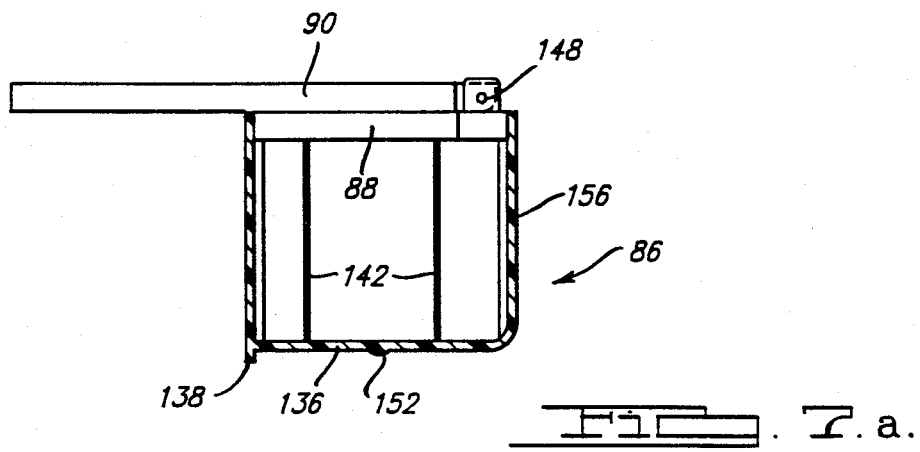
FIG. 7a is a cross-sectional view of the drip tray of FIG. 7 with upper drip tray in the use position.

With continued reference to FIG. 7 and the detail of FIG. 7A, drip tray 86 comprises a water containment pan 136 having a front face with downwardly extending ledge 138 adapted to interfit within a complementary recess 140 in the upper front module 52. Grate 88 rests within the open upper portion of pan 136 and upon the plurality of vertical strengthening ribs 142 positioned around the inner periphery of pan 136 Grate 88 includes a semicircular aperture 144 to facilitate removal of the grate for cleaning. The rear corners 146 of grate 88 are recessed from the periphery of pan 136 to provide triangular-shaped pour spouts for emptying the pan.

Fold down tray 90 is hingedly attached to grate 88 as at 148 and is provided with a plurality of slotted openings 150 through which water caught by the fold down tray in its horizontal position can drain through grate 88 and into pan 136.

The underside of pan 136 preferably includes a downwardly extending alignment nub 152 which mates with a corresponding alignment recess 154 in the bottom horizontal surface of upper front module 52. The rear sidewall 156 of pan 136 preferably rests against the rear horizontal sidewall 158 of upper front module 52 so that when the drip tray 86 is installed in place with alignments nub 152 and recess 154 in registration, the drip tray 86 is securely held so that it will not readily slide forward. The interfit of ledge 138 and recess 140, together with the registration of nub 152 with recess 154 and the coaction between rear sidewall 156 and rear horizontal wall 158 prevent the drip tray from rotating due to moments caused by placing containers upon the fold down tray 90. Fold down tray 90 is provided with a semicircular cut out portion 160 which may be grasped in order to fold the tray downwardly for use. The entire drip tray assembly can be readily removed by either lifting upwardly, exerting an upward force on hinges 148 by lifting the fold down tray or by reaching through aperture 144 and lifting the unit upwardly.

The presently preferred embodiments are primarily intended for placement with the rear of the cabinet facing a wall Accordingly, the presently preferred embodiments have an open back side as illustrated in FIG. 8. As also seen in FIG. 8, the cabinet is subdivided into upper and lower compartments, 93 and 94 respectively, by a center shelf 162. Center shelf 162 also supports the self-contained plumbing module 164 which includes a parallel flow refrigeration condenser coil 166 described more fully below. Water is drawn from bottle 68 through a wand 168 also described below.

The presently preferred cabinet construction is assembled using components which, for the most part, are fabricated of plastic using blow-molding techniques but are not limited to same. The cabinet components are fabricated for a snap-together construction requiring little additional fastening hardware.

Referring to FIGS. 9-14, the presently preferred blow-molded plastic side panel 50 is illustrated. In FIG. 9, the interiorly facing side of the right side panel is illustrated. The left side panel would be essentially a mirror image. Each side panel comprises a double-walled, preferably air-filled structure, as will be seen from the cross-sectional views of FIGS. 10-14. The upper edge 170 and front edge 172 are both provided with a pair of locking tabs 174. The locking tabs on the upper edge are used to attach the top module 56 while the locking tabs on the front edge are used to attach the upper front module 52.

As seen in FIG. 10, each locking tab comprises an elongated outwardly extending protrusion which is adapted to lockingly engage a corresponding slotted aperture constructed such as slotted apertures 176. The slotted apertures 176 illustrated in FIG. 9 are intended to receive the locking tabs 174 of the base member 96 of and the center shelf 162. However, the slotted apertures on other mating components of the cabinet are of a similar construction. FIGS. 11 and 12 illustrate the slotted aperture 176 in more detail. As depicted, each slotted aperture has an enlarged first recess portion 178 and a reduced second recessed portion 180 longitudinally displaced from and in communication with the enlarged recessed portion 178. The recessed portions are constructed of appropriate size that a locking tab 174 interfits in enlarged first recessed portion 178 without significant frictional contact, as depicted in FIG. 12, whereas reduced second recessed portion 180 is of a size such that when locking tab 174 is longitudinally slid into engagement with the second recessed portion, the tab frictionally fits to form a joint.

Preferably each joint between interconnecting members, such as between the side panel 50 and center shelf 162 is formed using a pair of slotted apertures 176 and a pair of locking tabs 174. Of course, other arrangements and numbers of locking tabs and apertures can be employed. Preferably associated with at least one of the slotted apertures and tabs is a locking means 182 which prevents the joint from being slidably disassembled after assembly. The presently preferred locking means comprises an inclined ramp 184 which is perhaps best seen in FIG. 14. Ramp 184 is situated in a recess 186. The mating cabinet member, such as center shelf 162 or the base member 96 is provided with a corresponding ramp 188 which is disposed along the surface of the edge of the cabinet member. During assembly the locking tabs 174 are inserted in the enlarged first recess portion 178 of the corresponding slotted apertures and the members are longitudinally slid (along the longitudinal axis of the slotted apertures 176), causing the locking tab to reside in the reduced second recess portion 180. This sliding movement causes ramps 184 and 188 to engage and ultimately lock together, preventing the reverse sliding movement which would disassemble the joined members. Should it become necessary to disassemble the cabinet for cleaning or replacement of one of the panel members, a flat blade screwdriver or the like can be inserted in recess 186 and twisted to assist in urging ramps 184 and 188 into disengagement. whereby the locking tab 174 may be longitudinally slid into the enlarged recessed portion 178 for removal of the associated panel. Although the locking and interfitting construction has been illustrated with respect to a side panel 50 and a base member 96 or center shelf 162, the same construction is utilized to secure the other cabinet members together.

The interfitting locking tabs and slotted apertures are preferably formed during the blow-molding or structural foam processes. While blow-molding and structural foam fabrication is presently preferred, other fabrication techniques are also possible. For example, structural foam may be used to fabricate the other cabinet members, or portions of or the entirety of the cabinet may be constructed from structural steel. Plastic is presently preferred because it affords a rustproof, dent and scratch resistant, easily cleaned, lightweight and hence easily shipped cabinet construction with an aesthetic, modern appearance.

Each side panel 50 is also preferably integrally formed to include the internal rail 128 utilized in the optional fold-down roller track and carriage assembly of FIG. 7. The internal rail is shown in FIGS. 9 and 13 and includes a rear stop 190 to prevent the carriage wheels 124 from rolling beyond the rear of the cabinet. As part of the blow-molding fabrication process, each side panel 50 (and also certain other cabinet components such as the lower door panel 54) are provided with periodically spaced cup-like indentations or recesses 192 which give the resulting panel improved rigidity by adhering to the opposite wall surface giving structural strength.

Figure 18:
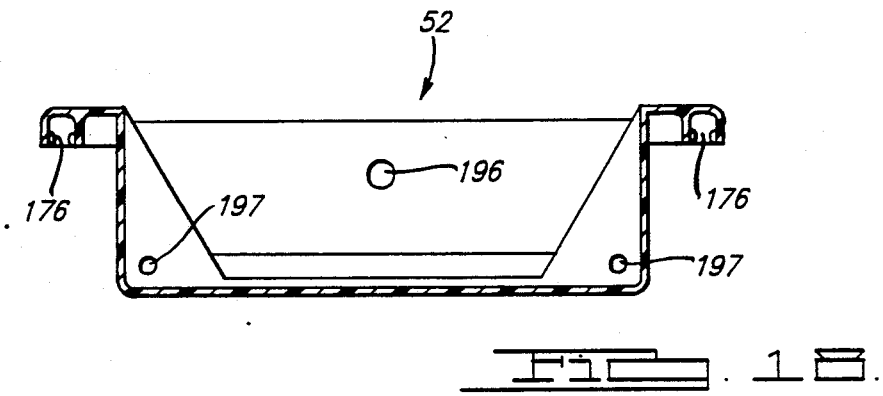
FIG. 18 is a cross-sectional view of the upper front module taken substantially along the line 18—18 of FIG. 15.
Figure 19:
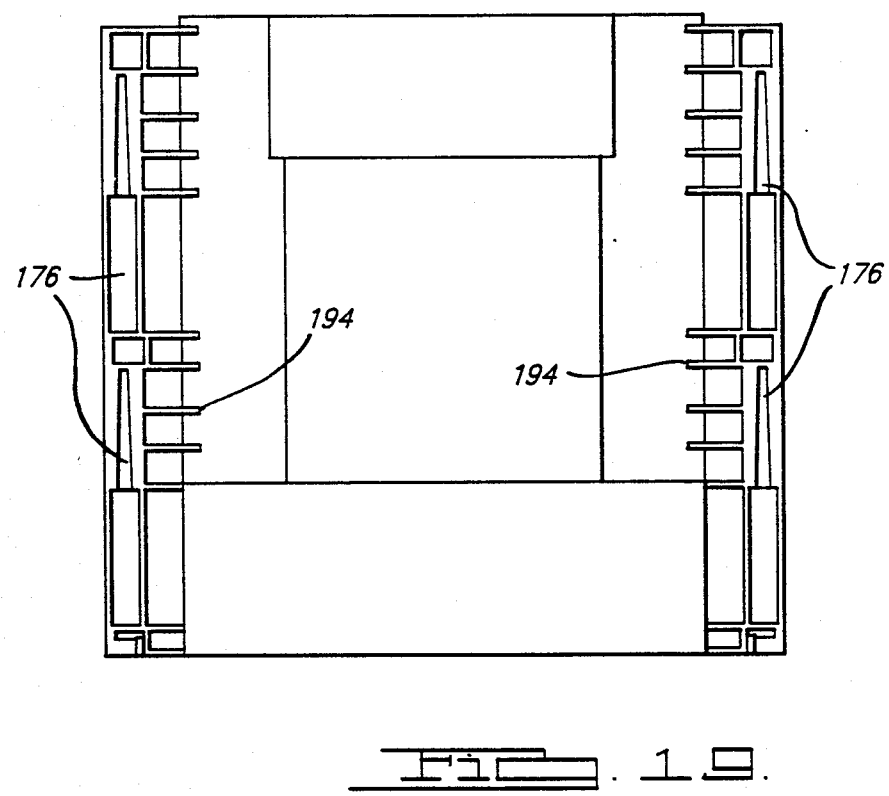
FIG. 19 is an interior plan view of the module of FIG. 15.

The upper front module 52 is adapted to attach to the locking tabs 174 situated on the front edge 172 of side panels 50. The upper front module is shown in FIGS. 15-19. The slotted apertures for securing the upper front module to the side panels are best seen in FIGS. 18 and 19. Preferably the upper front module is fabricated from molded plastic and includes structural ribs 194 in the interiorly facing side. shown in FIG. 19. The module 52 is preferably configured as shown in the drawings and includes aperture 196 to receive the water dispensing spigot (not shown). A pair of hinge sockets 198 (FIG. 15) are provided for receiving a hinge ball (not shown) which also mates in a corresponding hinge socket in the lower door panel 54. Two hinge sockets 198 are provided so that the door can be reversed to open optionally from the right-hand side or from the left-hand side. As shown in FIG. 16, module 52 also has a locking tab means in the form of ramp 184 for preventing disassembly of the module from the side panels. As seen in FIG. 18, the upper front module 52 has holes 197 to which overflow tubing from the hot tank 254 can be routed for draining into the drip tray.

Figure 20:
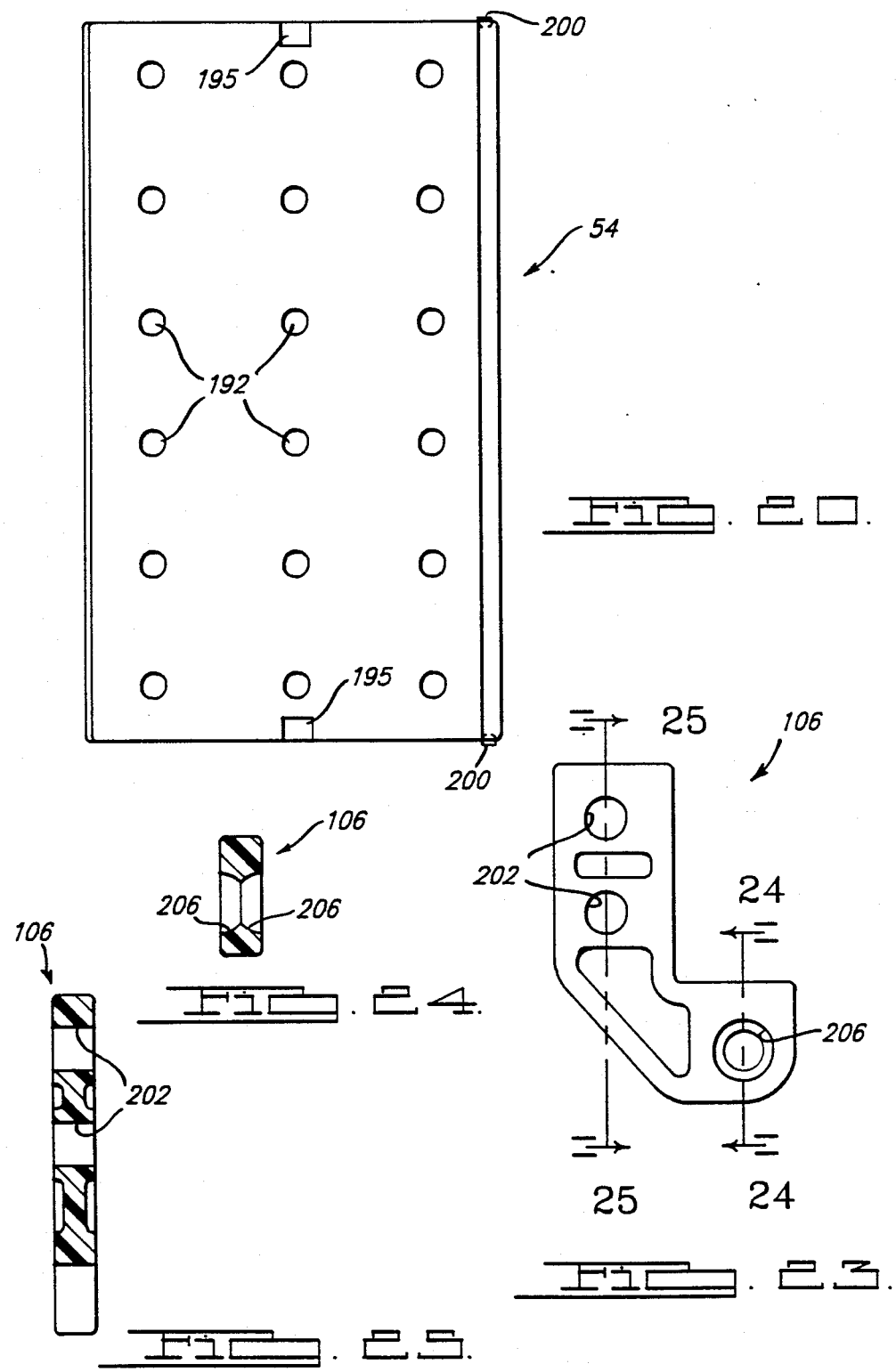
FIG. 20 is an interior plan view of the lower door panel.

The lower door panel 54 is shown in greater detail in FIG. 20. Lower door panel 54 is preferably constructed of a plastic material using blow-molding techniques. The panel is integrally formed with periodically spaced recesses 192 on the interiorly facing side similar to those of the side panels for the same reasons. Hinge sockets 200 in the form of hemispherical indentations are formed on the upper and lower corners of the panel, as illustrated. The hinge sockets are adapted to receive spherical balls, such as metal or plastic ball bearings on which the door panel may pivotally rotate. The upper hinge employs one of the hinge sockets 198 on the underside of upper front module 52. The lower hinge further employs the hinge plate 106, which is shown in detail in FIGS. 23-25. The door panel 54 has recessed latch receiving areas 195 to which suitable fasteners such as hook and loop (Velcro) fasteners can be attached for the purpose of holding the door panel shut.

In the presently preferred embodiment, the hinge plate is a molded plastic component having a pair of alignment holes 202 by which the hinge plate is attached to a selected left or right side of the lower cabinet on the underside of the base member 96. The hinge plate is further provided with a pair of opposing hinge socket formations 206 (see FIGS. 23 and 24). Depending on whether the hinge plate is attached to the left side or to the right side of the base member, the upwardly facing one of these hinge sockets receives the hinge ball to form the lower hinge upon which the door panel 54 is swung. See hinge ball 208 in FIG. 6. While the presently preferred hinge plate is a molded plastic component, other materials and fabrication techniques can be used. For example, if desired, the hinge plate can be made of metal. Plastic is presently preferred because it is inexpensive, lightweight, easily worked and provides a smooth and quiet operating hinge with self-lubricating properties.

Figure 21:
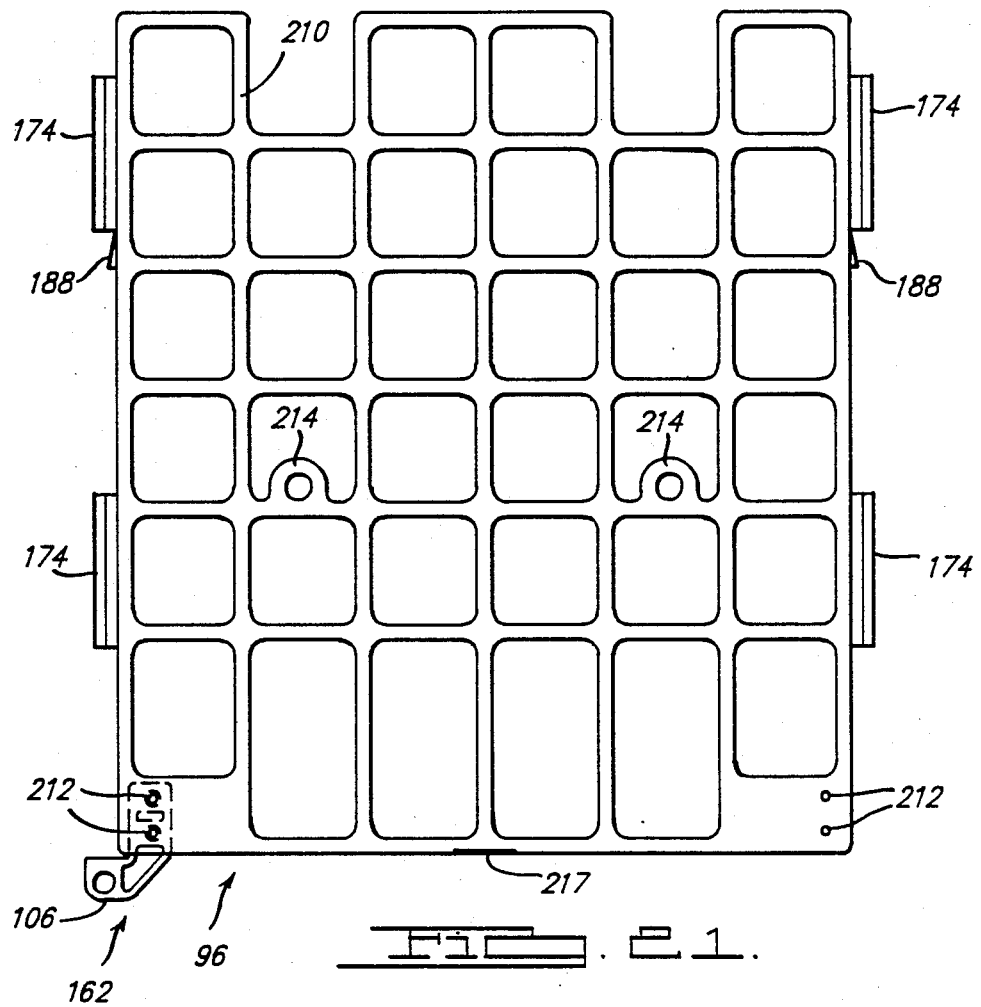
FIG. 21 is a plan view of an interchangeable shelf member usable in assembly of the presently preferred cabinets.

The base member 96 and center shelf 162 may be fabricated as identical and interchangeable components using structural foam, injection-molded plastic or the like. Of course, other suitable materials including structural steel can be used. FIG. 21 illustrates the presently preferred center shelf which can also be used as a base member. By making these components interchangeable, the cabinet is more economical to manufacture. However, if desired, the base member and center shelf could be fabricated as noninterchangeable components.

The base member and center shelf of FIG. 21 defines an open grid or honeycomb structure 210 having locking tabs 174 and locking means in the form of ramps 188 on the left and right edges. Suitable mounting holes 212 are provided along the front edge for receiving the hinge plate on either the right-hand side or the left-hand side, as desired. Hinge plate 106 is shown on the left-hand side for illustration purposes. In the center of the grid structure 210 are a pair of aperture forming loops 214 to which the plumbing module 164 may be attached to center shelf 162 As seen in the front edge view of FIG. 22, a pair of recesses 216 are provided along the front edges for receiving the hinge plate 106 (not shown) and a recessed area 217 is provided to receive suitable hood and loop (Velcro) fastener to mate with the corresponding latch structure on the door panel. Hinge plate mounting can also use two shim plates (not shown) between the hinge plate and the base member to provide proper door alignment.

Figure 22:
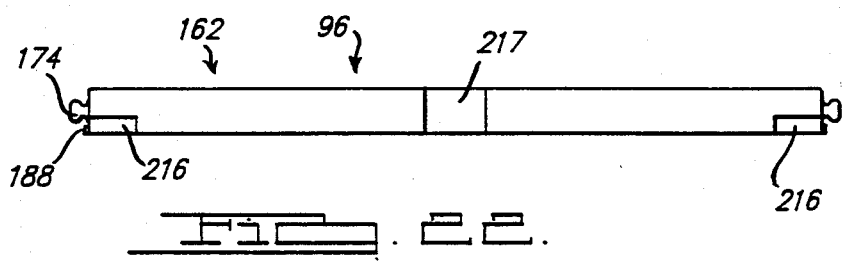
FIG. 22 is a front end view of the shelf member of FIG. 21.

The base member and center shelf construction of FIGS. 21 and 22 may be used to construct the embodiments of FIG. 1, FIG. 2 and FIG. 7. In order to construct the embodiment of FIG. 5, the modified base member of FIG. 5 is required to accommodate the front roller structure and to provide the inclined plane.

Figure 26:
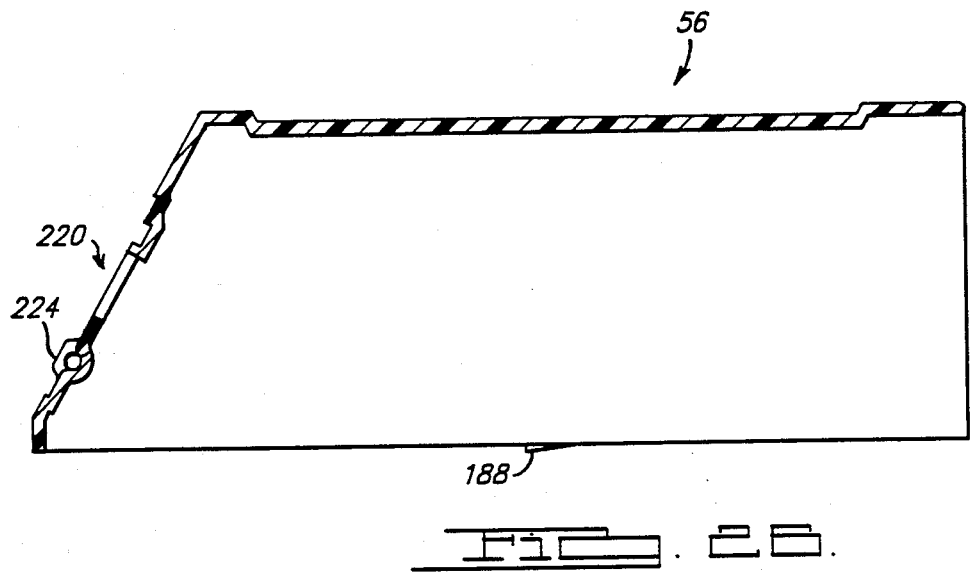
FIG. 26 is a cross-sectional view of the top module for use in constructing the cabinet embodiment of FIG. 1.

The top module 56 is shown in FIGS. 26–29. The top module 58 for the upper mounted configuration of FIG. 2 would be of similar construction, providing the raised annular portion 66 with neck-receiving aperture 64 therein. The presently preferred top module is a molded plastic component having structural ribs 218 (FIGS. 28 and 29) for added strength. The module is adapted to lock fit onto the locking tabs 174 on the upper edges 170 of the right and left side panels 50. Slotted apertures 176 (FIGS. 28 and 29) are provided for this purpose. A means for preventing the top module from being slidably removed, once installed, is provided in the form of ramp 188 (FIG. 26). Ramp 188 interlocks with the corresponding ramp 184 formed in the recess 186 along the upper edge 170 of each side panel 50. The front face 220 of module 56 is inwardly sloping and inclined to afford convenient access to the push button structure by which the water dispensing apparatus is actuated. Front face 220 includes an appropriately shaped opening into which push buttons 80, 82 and 84 rotate during operation.

Figure 27:
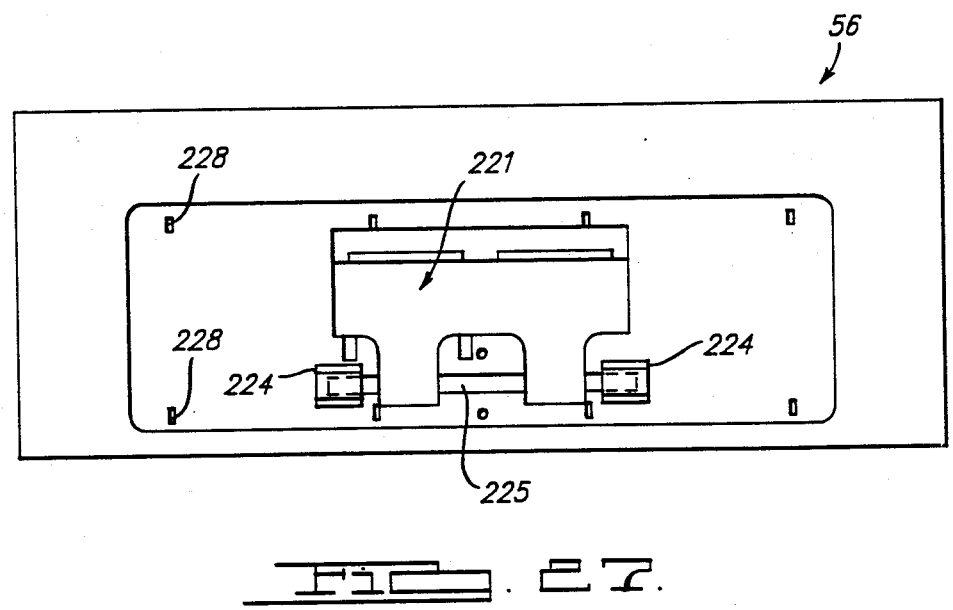
FIG. 27 is a frontal view of the top module of FIG. 26, illustrating the openings for receipt of push button actuators.
Figure 28:
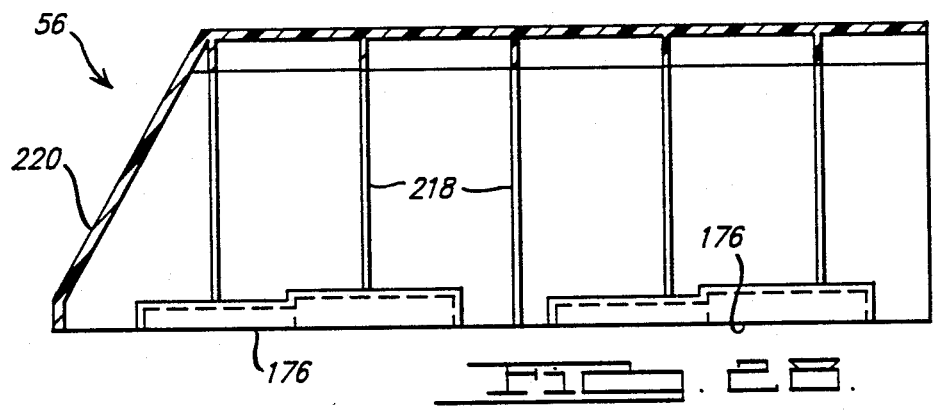
FIG. 28 is a cross-sectional view of the top module showing additional internal constructional details.
Figure 29:
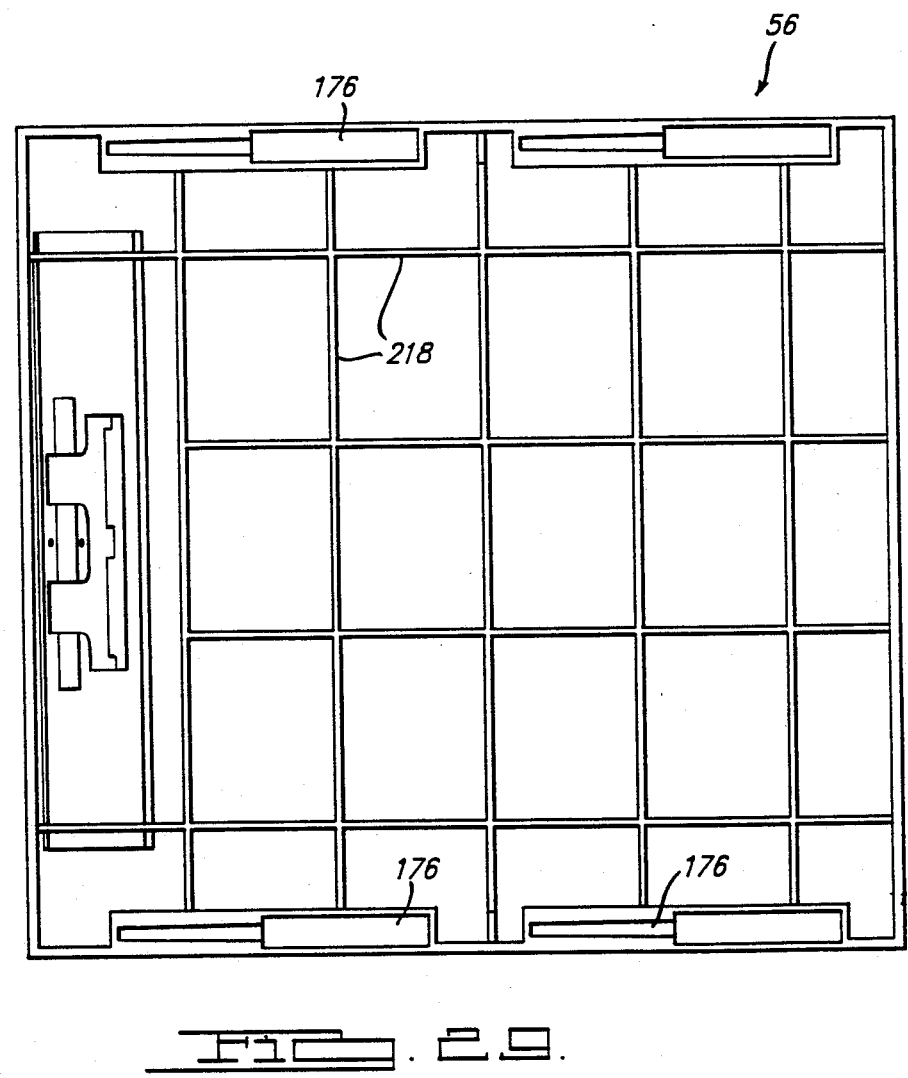
FIG. 29 is a plan view of the underside of the top module.
Figure 30:
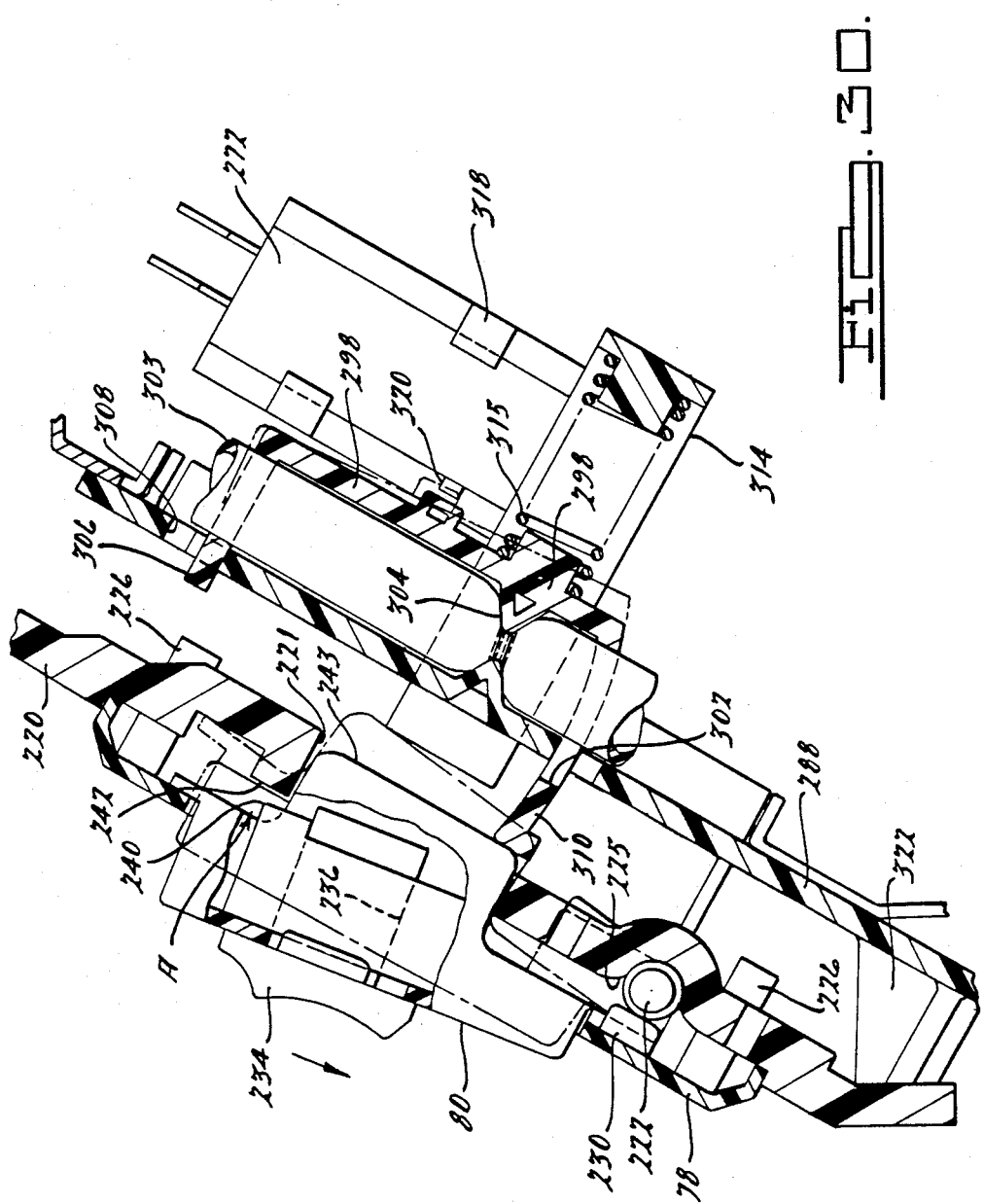
FIG. 30 is a cross-sectional view taken through the vent valve, illustrating the construction and operation of the push button actuators in greater detail.
Figure 31:
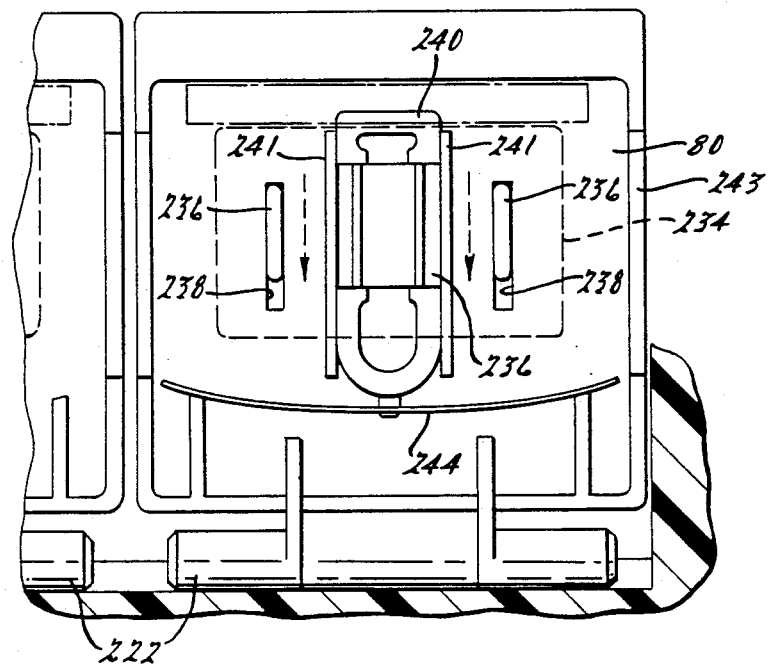
FIG. 31 depicts the underside of a push button actuator in accordance with the invention.

Referring to FIGS. 27, 30 and 31, the presently preferred push button actuators 80, 82 and 84 are attached to the font face 220 for pivotal movement about axles 222. The push buttons are provided with integral axles 222 which are pivotally carried in the journal structures 224 and channel 225 formed in the front face 220. Bezel 78 (FIG. 30) is attached to the front face by inserting locking tabs 226 in the rectangular holes 228. The underside of the bezel is provided with raised ears 230 which are spaced apart so that they contact axle 222 on both sides of the lower portion of each push button to aid in holding the axle in place. The ears 230 hold the axle in place so that the push button is journaled for limited rotational or pivotal movement within opening 221.

With continued reference to FIGS. 30 and 31, push button 80 has a safety latch 234 which prevents the push button from being depressed unless the safety latch is first slid downwardly, generally in the direction of the arrow shown. Safety latch 234 has mounting fingers 236 which extend through slots 238 in the push button. The slots 238 are elongated to provide sliding movement of the safety latch in the direction of the arrow shown. The safety latch includes an integral blocking structure 240 which slides in an opening in button 80 between rails 241 and which abuts wall 242 of front face 220 when the safety latch is in the upwardly disposed position of rest. In this position, interference between the blocking structure and the wall prevents pivotal movement of the push button. By sliding safety latch 234 in the direction of the arrow to the lowermost position, adequate clearance is provided so that blocking structure 240 no longer interferes with wall 242 and the push button may be depressed and pivoted inwardly about the axle. The safety latch is spring loaded by means of a leaf spring 244 which biases it towards the upwardly disposed position of rest. The safety latch preferably employs a spring strong enough to prevent small children from being able to operate the push button. This safety latch can be provided on both hot and cold water buttons 80 and 82, if desired. For improved appearance and symmetry an imitation safety latch button can be molded into a push button which does not require the safety latch feature.

Figure 35:
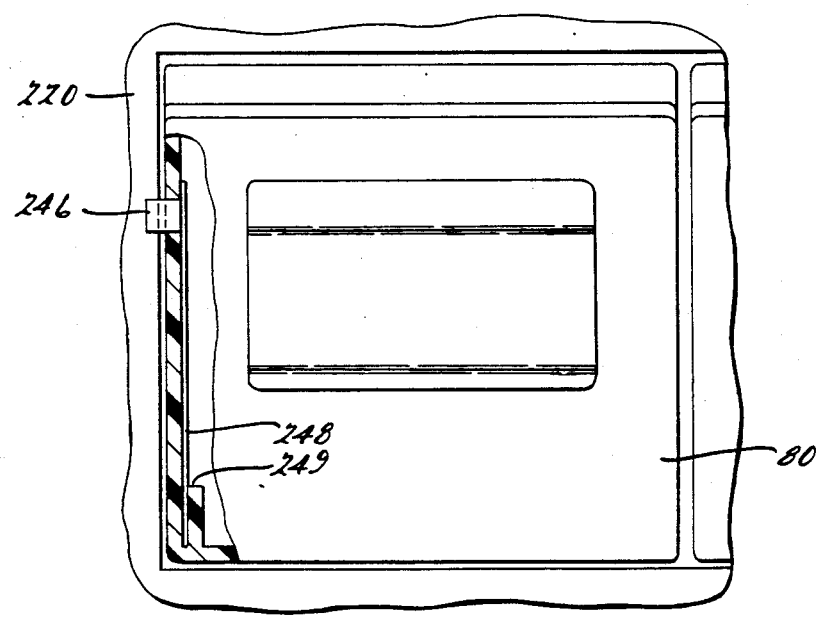
FIG. 35 is a partially cut away front view of an alternate push button actuator.

An alternate safety latch configuration is shown in FIG. 35. As illustrated, push button 80 may be modified to include a safety latch button 246 which protrudes through an opening in the side of push button 80. Safety latch button 246 is carried on a leaf spring 248, the opposite end of which is inserted in mounting channel 249 on the under lower side of the button 80. In the outwardly extending position of rest, safety latch button 246 prevents actuator button 80 from being depressed by blocking the inward rotational movement of button 80. In order to actuate button 80, the safety latch button is first depressed to provide sufficient clearance between the safety latch button and the side surface face of bezel 78. With the safety latch button no longer interfering, push button actuator 80 can be depressed to dispense water. The push buttons are thus incorporated into the modular construction as part of the top module. The push buttons in turn operate upon the valves which actuate the water dispensing assembly. The valves are included as part of the self-contained plumbing module 164 discussed more fully below.

The cabinet construction described above provides many advantages. It may be shipped in a disassembled state which is quite compact. Once assembled, the cabinet is quite stable and rigid and does not suffer from racking problems exemplified by a collapsing parallelogram. The modular components interfit and lock together so that relative movement of the modules is restrained in the three orthogonal axes. In order to assemble the cabinet using the modular components, the side panels 50 are snap fit onto the base member 96 and center shelf 162. The hinge plate 106 is attached with suitable fasteners such as self-tapping screws and shim plates (not shown) to the selected apertures on the base member, depending upon whether a right-hand or a left-hand compartment door is desired. A first hinge ball is inserted in the hinge socket 206 of hinge plate 106 and the lower door panel 54 is then placed on the hinge so that the hinge ball rests in the hinge socket 200 of the lower edge of the door panel 54. A similar hinge ball is placed in the upper hinge socket 200 of the door panel 54 and the upper front module 52 is then slidably and downwardly snapped into place on the front locking tabs of the side panels. In so doing, the hinge socket 198 of the front module captures the upper hinge ball to hold the lower door panel 54 in place. In the alternative, the front module can be assembled first, followed by the door panel 54 and finally by the hinge plate 106.

Finally the top module is attached to the top of the cabinet by aligning the locking tabs in the corresponding channels along the top edge of the side panels and then sliding the top module forward until it snaps into place. The drip tray may then be inserted to complete the cabinet assembly.

Once the cabinet has been assembled, the self-contained plumbing module slides into the rear of the cabinet while resting upon the center shelf 162. When the plumbing module is fully slid into place, the valves are in alignment with the corresponding push buttons and the water dispensing faucet or outlet fitting 264 (discussed below) aligns with the aperture 196 in the top underside of the upper front module 52 through which water is dispensed. The self-contained plumbing module may be secured in place using suitable fasteners through the aperture forming loops 214 of the center shelf 162 and securing the body spigot (not shown) through aperture 196 into the outlet fitting 264.

Figure 32:
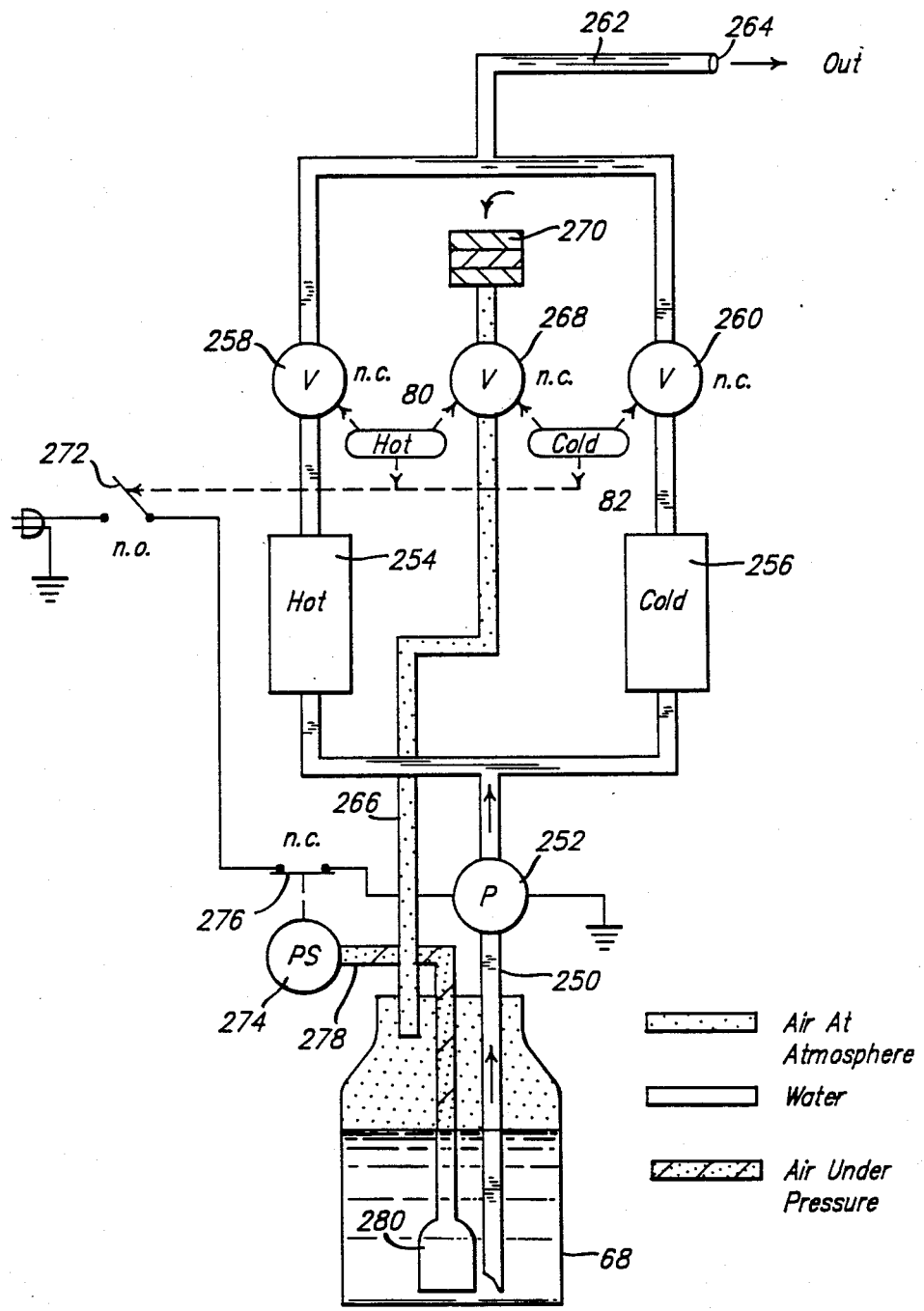
FIG. 32 is a schematic diagram illustrating the presently preferred vent on demand plumbing system.

Before a more detailed description of the self-contained plumbing module is given, an overview of the plumbing system may be useful. FIG. 32 schematically depicts the presently preferred vent on demand plumbing system. In FIG. 32 a hot and cold water dispensing system is depicted. Water is drawn from bottle 68 through water draw tube 250 by means of pump 252. Pump 252 delivers water under pressure to both a hot storage tank 254 and a cold storage tank 256. The hot storage tank may be heated by means of an electrical resistance heater (not shown) and the cold water tank may be cooled using a refrigeration system (not shown). The outlet of hot water tank 254 is connected to a normally closed valve 258. The outlet of cold water tank 256 is similarly connected to a normally closed valve 260. The outlets of both valves 258 and 260 merge to a common outlet tube 262, the end of which forms the water dispensing outlet fitting 264. Bottle 68 is sealed at the top to prevent contamination from entering the bottle. In order to compensate for pressure changes in the bottle as water is withdrawn, a vent tube 266 communicates with the upper air filled portion of the bottle. Vent tube 266 is connected to the outlet of a normally closed valve 268. The inlet of valve 268 may be connected to a filter through which air at atmospheric pressure may enter.

When the hot water button 80 is actuated, both valves 258 and 268 are actuated substantially simultaneously. Actuation of these valves thus substantially simultaneously opens the hot water tank 254 for dispensing and allows air at atmospheric pressure which may be filtered to vent into bottle 68 in order to equalize pressures within the bottle to atmospheric. Momentarily after valves 258 and 268 are opened, push button 80 also closes a normally open limit switch or microswitch 272 which delivers electrical current to pump 252 which energizes the pump and causes water to be drawn from bottle 68 and pumped into hot tank 254. As water is pumped into the hot tank, the building pressure within the hot tank causes hot water to be dispensed through outlet fitting 264. If room temperature water for cooking is desired, the hot tank can be eliminated.

Depressing the cold button 84 causes a similar sequence to occur. Valves 268 and 260 are opened and limit switch 272 is closed, causing cold water to be dispensed through the outlet fitting 264.

The system includes a water level sensor in the form of a pressure switch 274 which acts through a pair of normally closed contacts 276 to break the electrical circuit supplying energy to pump 252 when the water level drops to a predetermined low level. The pressure switch is preferably an air pressure sensing switch which is coupled through pressure tube 278 to a bulb well 280 disposed at the lowermost portion in bottle 68. The bulb well communicates with pressure tube 278 and is generally bell-shaped The bulb well is inserted in bottle 68 when the bottle is full. The bell-shaped interior of the bulb well captures air as the bulb well is inserted below the water level surface and this captured air is placed under pressure as a natural consequence of the bulb well and pressure tube 278 being forced to the bottom of the bottle. As illustrated, the bulb well when inserted in the bottle is filled with water and the pressure tube is partially filled with water, the remaining portion being filled with captured air under pressure. The air pressure in the bulb well and pressure tube is inversely proportional to the height of the water in bottle 68. Pressure switch 274 measures this positive air pressure and maintains the contacts 276 closed until the air pressure drops to a predetermined low level indicative of a low water level in the bottle.

Because the system is sealed at all times except during the brief times during which water is being dispensed, it is desirable to configure the pressure switch so that it shuts off the pump before the water level drops low enough to permit air to enter the water draw tube 250. By preventing air from entering the water delivery system, a smoother water delivery is ensured. Preferably the water draw tube, vent tube and pressure tube form an integral suction wand assembly, which is described more fully below. Check valves may be provided in the suction wand assembly to prevent air from entering the water draw tube when the wand assembly is momentarily removed from the bottle during refilling.

Figure 33:
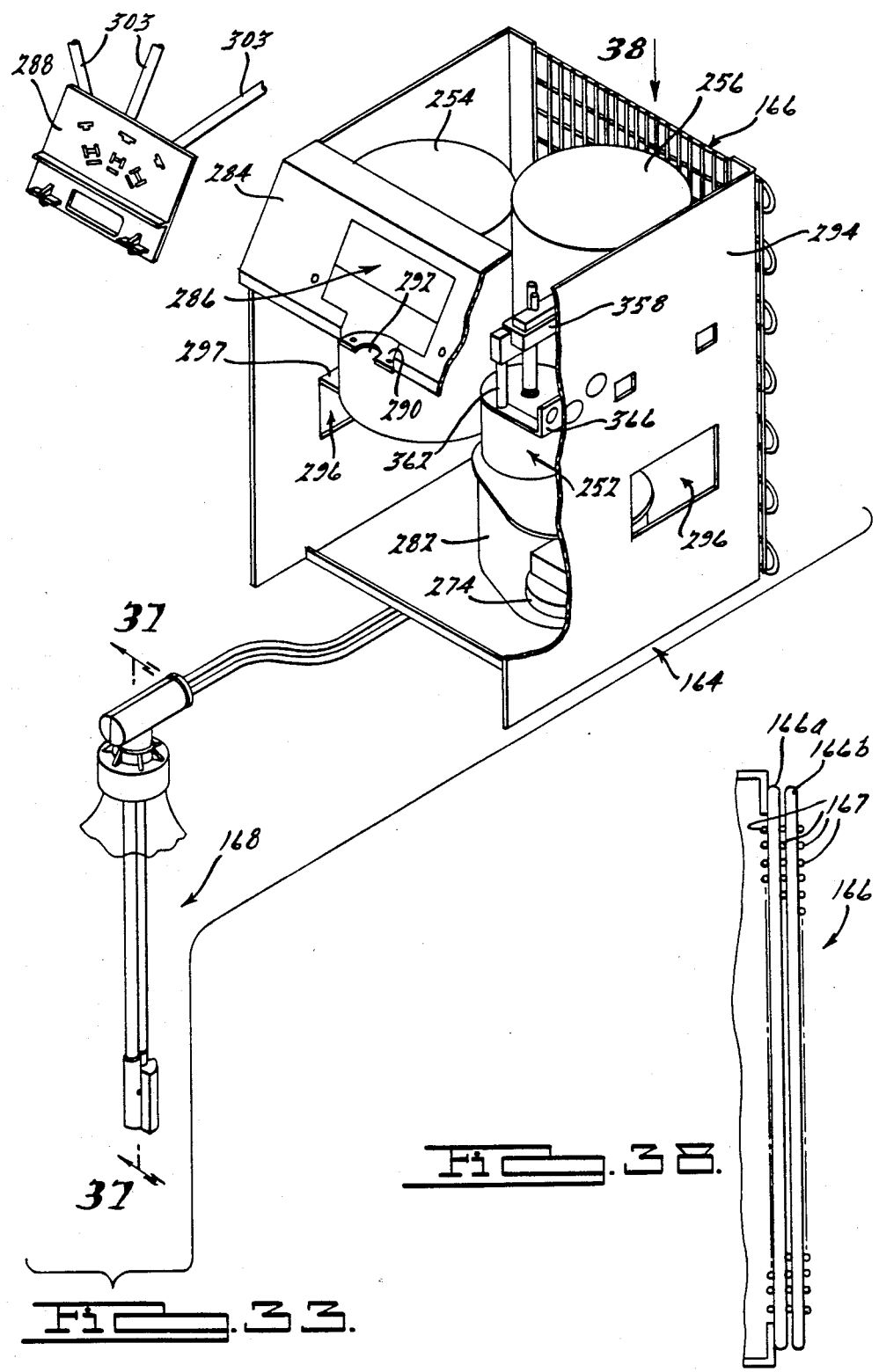
FIG. 33 is a cut away perspective view of the presently preferred plumbing module.

FIG. 33 depicts the self-contained plumbing module 164 in greater detail. The plumbing module is preferably fabricated from stamped steel, although other materials and construction techniques may be used. The presently preferred locations of the hot tank 254, cold tank 256 pressure switch 274 and pump 252 are illustrated. Also illustrated is the refrigeration compressor 282 and refrigeration condenser coil 166. Also shown is the suction wand 168. The front upper part of the plumbing module has an inclined face 284 which has a rectangular cutout 286 for receiving the valve plate 288. The valve plate is shown in exploded perspective view in FIG. 34 and in assembly in FIG. 30. The lower central part of the inclined face is bent downwardly and inwardly to define a ledge 290 which is cut away as at 292 to provide a mounting structure and clearance for the water dispensing outlet fitting 264. Both side panels of the plumbing module housing are provided with handle openings 296 which are preferably fabricated by stamping so that the waste material 297 is bent inwardly along the top seam to provide a smooth or rounded edge for lifting the module. The module also has an electrical service cord (not shown).

Snap fitted onto valve plate 288 are three lever arm valve pilots 298 which are each provided with upper and lower tube receiving apertures 300 and 302. See FIGS. 30 and 34. A length of flexible plastic or rubber tubing 303 is fed through apertures 300 and 302 and the lever arm valve pilots are each provided with a valve crimping seat area 304 which closes the valve by pinching the tube against the back side of the valve plate, fully pinching off or occluding it. The valve pilot on the far left (as viewed from the front of the cabinet) receives the tubing from hot water tank 254; the valve pilot in the center receives the vent tubing 266; and the valve pilot on the far left receives the tubing from the cold water tank 256. If hot water or room temperature cooking water is not required, the valve structure associated with hot button 80 can be eliminated. A double sized button 84 can then be used in place of buttons 80 and 82.

The lever arm valve pilots have interlocking upper tabs 306 which fit in slots 308. The lower tabs 310 are adapted to fit through slots 312 for reciprocating pivotal movement or rocking movement about the axis defined by the tabs 306 and slots 308. Lower tabs 310 are appropriately arc-shaped to accommodate the rocking movement.

Positioned behind each of the lever arm valve pilots is a spring cage 314 which snap fits into slots 316. Each spring cage holds a compression spring 315 which applies a force on the lever arm valve pilots, forcing the pilots into a normally closed position whereby the corresponding plastic or rubber tube is pinched off.

The center spring cage is provided with a mounting bracket 318 which is attached to one side of the spring cage by a sliding snap action and is adapted to hold limit switch 272. Limit switch 272 is held with its actuator button 320 positioned so that the center lever arm valve pilot will depress it when the lever arm is urged inwardly toward the open position. The geometry of the valve construction is such that the hot and cold tank tubes and center tube are opened momentarily before the limit switch button 320 is depressed. This ensures that the valves are open before the pump is energized. The lower tabs 310 are arranged so that the hot push button 80 simultaneously activates both the left and center valves, while depressing the cold button 82 activates the right and center valves. Specifically one of the rails 241 of buttons 80 and 82 activate the center valve while the raised peripheral edge 243 of the buttons activate the left and right valves respectively. (See FIG. 31).

The water outlet fitting 264 has a pair of nipples which join internally to provide a single dispensing outlet A body spigot is attached to the outlet fitting once the plumbing module is assembled to the cabinet for providing proper stream direction. These nipples receive hot and cold water from the respective tanks 254 and 256 via tubing 303. The valve plate, outlet fitting, body spigot, lever arms, spring cages and switch mounting bracket can all be fabricated from injection-molded plastic. The valve plate is provided with positioning bosses 322 to ensure proper alignment of the plate with the push buttons mounted on the top module part of the cabinet.

For a better understanding of the presently preferred valve configuration, reference may be made once again to FIG. 30. FIG. 30 depicts the center valve which controls the venting system. As such, it includes the limit switch 272 and associated mounting bracket 318. The hot and cold water valve are constructed essentially the same, except that the limit switch and bracket are not required on those valves. Although the safety latch 234 has been illustrated in FIG. 30, it will be understood that the safety latch can be deleted if this feature is not desired.

As shown, blocking structure 240 is coupled via fingers 236 to the safety latch 234 for up and down reciprocating sliding movement. In FIG. 30 blocking structure is shown in the upwardly disposed blocking position of rest. In this position, the blocking structure interferes with wall 242 as at A. This prevents push button 80 from any significant pivotal movement about axle 222. When safety latch 234 is slid downwardly, the blocking structure 240 and wall 242 clear one another and push button 80 can be pivotally rotated about the horizontal axis of axle 222 to the dashed position shown in FIG. 30.

Figure 34:
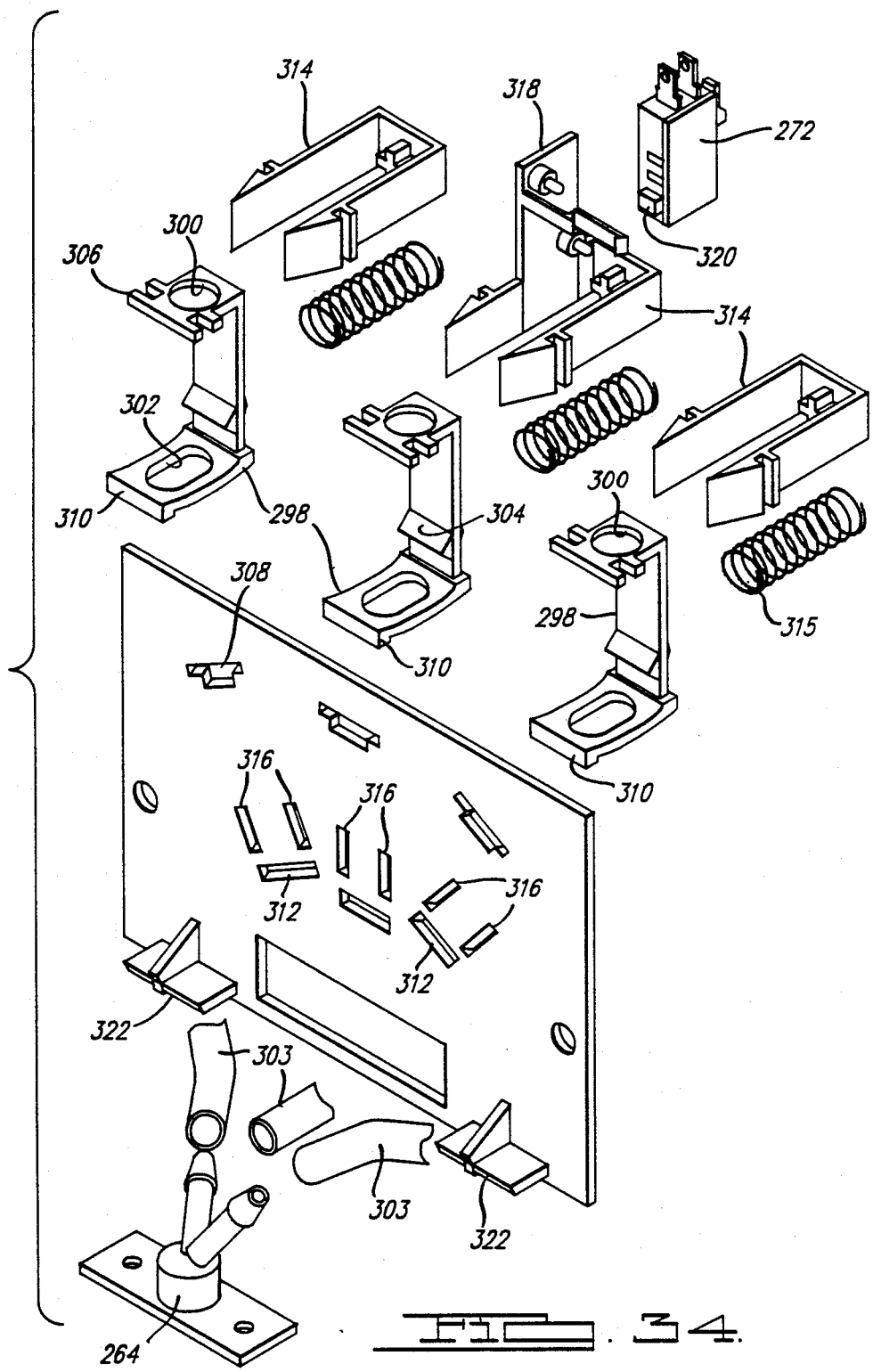
FIG. 34 is an exploded perspective view of the pinch valve embodiment in accordance with the invention.

Pivotal movement of push button 80 or 82 applies a force to lower tab 310 of the valve pilot 298 The lower tabs are positioned as seen in FIG. 34 so that the center tab (associated with the center vent valve) is actuated by one of the raised sidewall structures 243 of both push buttons 80 and 82, depending on which is being depressed. Sidewalls 243 are shown in FIGS. 30 and 31. The right and left-hand lower tabs 310 of the hot and cold water valve structures are similarly actuated by one of the rails 241. Thus when the hot water button 80 is depressed, both the vent valve and the hot water valve are simultaneously actuated. Similarly, when the cold water button 82 is depressed, both the vent valve and the cold water water valve are simultaneously actuated.

With continued reference to FIG. 30, actuation of push button 80 causes the pilot 298 to pivot about the axis defined by upper tab 306 and slot 308. This pivotal movement compresses bias spring 315 and relieves the crimping pressure at 304 to open the valve.

As the pilot rotates toward the uncrimped and open position, it ultimately contacts and actuates limit switch button 320 to energize the pump. The geometry of the components are such that the tubing 303 is opened for fluid flow a moment before the limit switch button is actuated. This ensures that the pump will not be energized before the lines are free to dispense water.

When pressure is removed from push button 80 or 82, the spring 315 causes pilot 298 to return to the resting position shown in FIG. 30 whereby tubing 303 is pinched off.

Referring now to FIGS. 36 and 37, the presently preferred suction wand assembly is illustrated. The wand comprises a handle 324 preferably fabricated as two injection-molded halves and having openings 326 through which pass the flexible plastic tubing comprising the water draw tube W, the vent tube V and the pressure sensing tube P. An adapter plate 328 has nipples on one side for connection to the three flexible plastic tubes and is carried in a selected one of two different annular slots 330. The appropriate slot is selected to determine the length the down tube protrudes from the handle into the interior of the bottle. Different sized water bottles may have different heights as measured from the neck of the bottle to the base. The adapter plate is secured in the appropriate annular slot to provide a down tube of appropriate length for a given bottle.

The down tube 332 is preferably extrusion-molded plastic and defines two separate tubes, one for drawing water from the bottle and the other for coupling to the pressure switch. The down tube is sized to interfit with collars on the underside of the adapter plate so that one of the tubes communicates with the water port 334 and the other communicates with the pressure port 336. The vent port 338 does not require a down tube extension since is must only communicate with the air space in the neck of the bottle. A collar 340 of injection molded plastic is slid onto the down tube and secured about the lower exterior 325 of handle 324. A gasket 342 is positioned within the collar. Ring clamps 344 are used to secure the handle together.

A bulb well 346 is attached to the lower end of down tube 332. The bulb well defines a water suction cavity 348 and an air pressure cavity 350. The water suction cavity communicates with water port 334 while the air pressure cavity communicates with pressure port 336. The bottom edge of the water suction cavity is cut at an angle B so that the angled portion can be placed in the lowermost corner of the water bottle when it is tipped on inclined plane defining member 98. The down tube may be sufficiently bent during fabrication to accomplish this.

Preferably the water suction cavity is provided with a check valve seat nest 352, a check valve ball 354 and a ball retainer 356 secured in holes on opposite sides of the bulb well structure or embossed on the inside of the tube. The bulb well is preferably injection-molded as interfitting halves which facilitate assembly of the check valve seat nest, check ball and ball retainer components. The air pressure cavity is an enlarged bell-like cavity for capturing air under pressure as the bulb well is forced to the bottom of the bottle during installation.

The suction wand assembly thus provides an easily assembled article which can be readily cleaned and repaired. The built-in check valve ensures that water remains in the water suction side of the down tube when the wand is removed from a bottle as an empty bottle is replaced with a full one. This minimizes the chance for air to enter the water delivery system and thus ensures smooth and even dispensing without spurts. The suction wand assembly is readily adaptable to different sized bottles and the modular construction permits the assembly to be adapted quite easily to bottle dimension changes which may be encountered during the lifetime of the product.

If desired, the suction wand assembly can be modified to include a detachable fitting which permits the wand to be disassembled and removed from the flexible tubing connecting it with the plumbing module. This modification may be desired in applications where frequent cleaning of the down tube is desired or in applications in which the wand is not needed. In such a modified embodiment, a check valve mechanism may be employed at the detachable fitting to serve the same purpose of preventing air from entering the water suction side of the system. Other modifications of the suction wand assembly are also contemplated. For example, if desired, the vent port 338 can be provided with a filtration system which would serve as filter 270 (FIG. 32). In the alternative, or in addition, a filtration system could be provided on the air inlet end of the vent tubing at the valve end of the tubing.

From the foregoing it will be appreciated that the presently preferred plumbing module is a self-contained and quite compact unit which provides both hot and cold water capabilities together with a vent on demand water delivery system. The suction wand permits the placement of the water bottle within the lower interior space of the cabinet. Hence the user does not have to lift heavy water bottles in order to use the system.

Part of the compactness of the plumbing module can be attributed to the manner in which the refrigeration system is constructed. More specifically, the refrigeration system uses a unique parallel tube refrigeration condenser coil 166 shown in FIG. 38. The refrigeration condenser coil comprises a pair of substantially coterminous serpentine tubes 166a and 166b which are held together and in spaced relation to one another by means of a plurality of transversely extending heat conducting rods 167. The serpentine tubes are coupled to the refrigeration system in parallel so that Freon or another suitable coolant flows through both tubes in essentially the same direction and at the same time in parallel. It has been found that this construction provides adequate heat dissipation without requiring forced air cooling fans, which are noisy and consume additional electrical power. A significant advantage of the dual refrigeration condenser coil system is that it provides the required heat dissipation without occupying much space. As seen in FIG. 8, the condenser coil does not extend below the plane of the bottom of plumbing module 164. A refrigeration coil of conventional design, such as those found on conventional water chilling drinking fountains, would extend substantially below the plane of the bottom of the plumbing module. Using the dual parallel condenser coil illustrated, the plumbing module is a compact box-like unit which may be readily boxed and shipped without risk of damaging the condenser coil. This enables the entire bottled water cooler product to be shipped in a disassembled state, with cabinet fully knocked down, at significant space and shipping cost savings. A plumbing module having convention single tube refrigeration coil extending below the plane of the bottom of the module would be too delicate to box and ship conveniently and the bottled water cooler product having such a module would not lend itself well to shipping in a disassembled state. The ability to ship in a disassembled state is important, since the volume occupied by the bottle (which is essentially wasted space during shipping) can be avoided.

While the presently preferred dual parallel condenser coil configuration places essentially two identical, half length, refrigeration coils directly coincident beside one another, other configurations are possible, such as a configuration in which the coils are staggered rather than coincident with one another, so that the exposed surface area of the coils can be further maximized.

While the presently preferred dual parallel condenser coil configuration places essentially two identical, half length, refrigeration coils directly coincident beside one another, other configurations are possible, such as a configuration in which the coils are staggered rather than coincident with one another, so that the exposed surface area of the coils can be further maximized.

To provide the necessary energy for drawing water from a lower mounted bottle up to the dispensing height at the top portion of the cabinet, pump 252 is provided. Gravity can be relied upon to supply some or all of the energy required to deliver water from the bottle to the dispensing spigot in the upper mounted bottle configuration of FIG. 2. The presently preferred pump provides a constant flow rate, is self-priming, is not attitude sensitive (it works equally well in all planes of orientation) and it can draw water through its inlet port up a height of about 4 feet and can raise water expelled through its outlet port to a height of about 6 feet. The presently preferred pump uses mostly plastic components, has a minimal number of moving parts with very few components touching the water being pumped. Hence the pump imparts little or no taste to the water. Furthermore, the presently preferred pump does not draw air into the system during operation.

Figure 39:
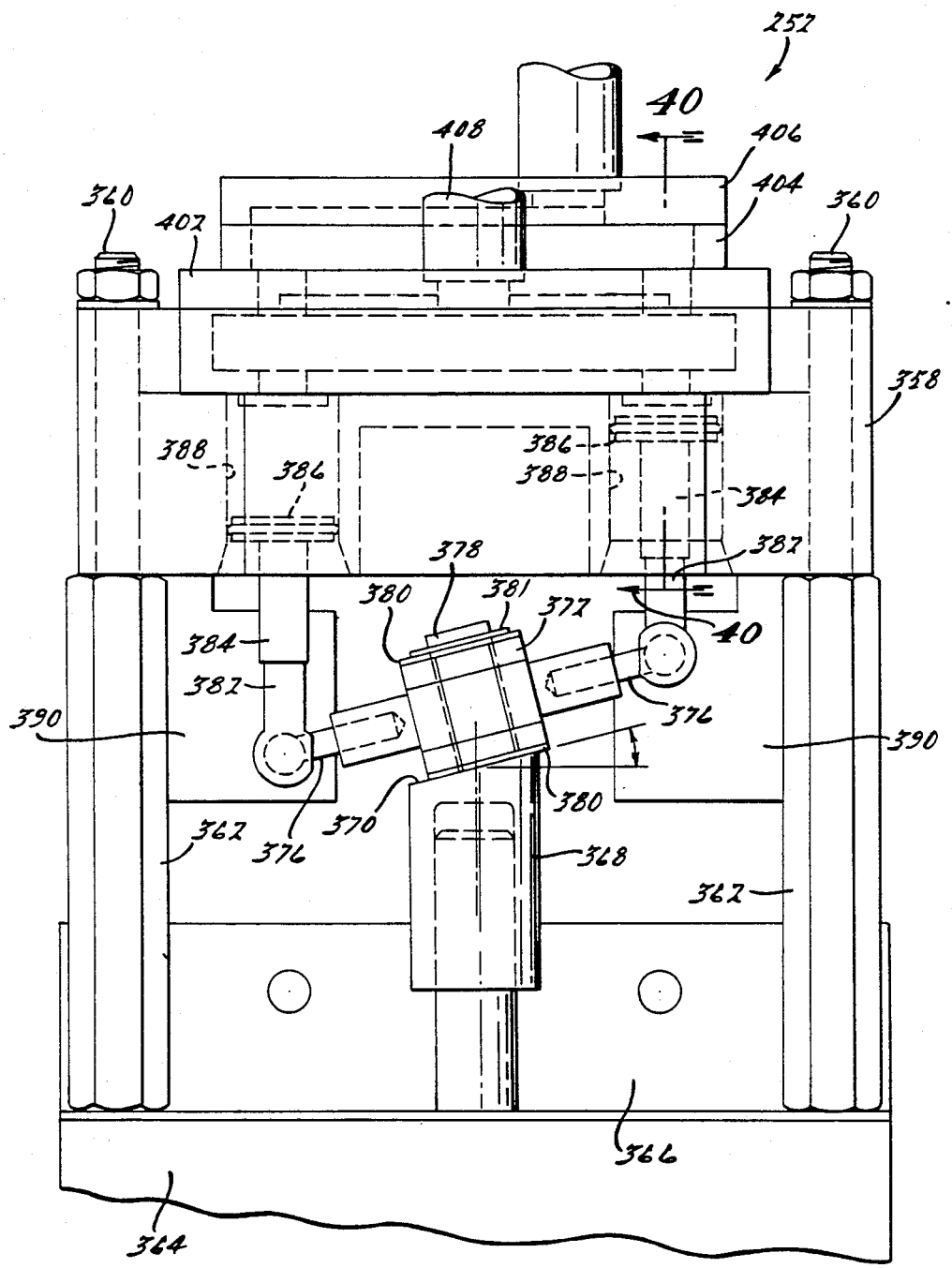
FIG. 39 is a detailed view of the presently preferred pump.
Figure 40:
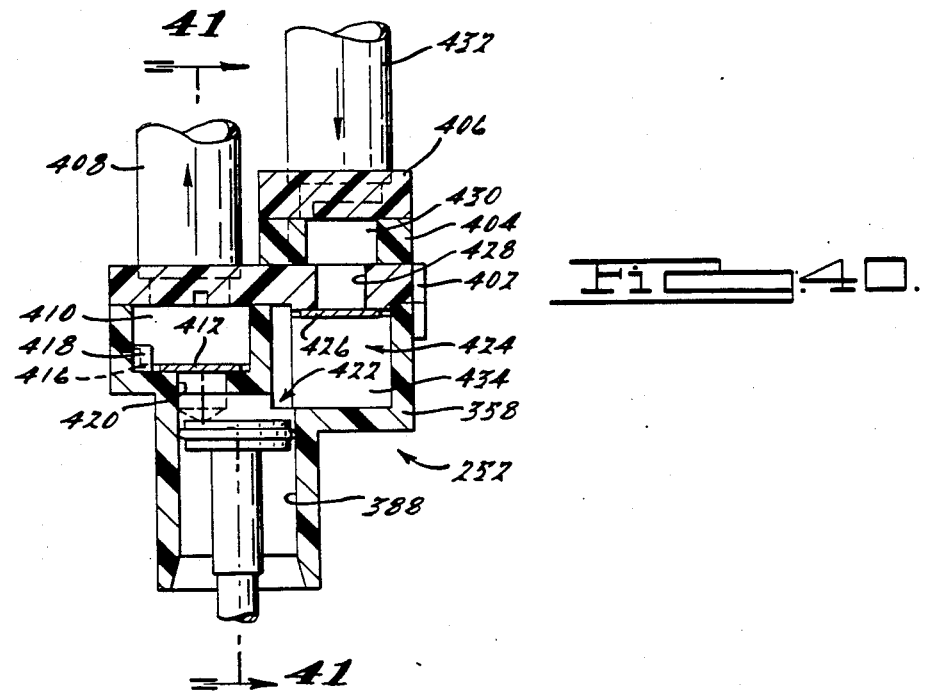
FIG. 40 is a cross-sectional view of the pump of FIG. 39, taken substantially along the line 40—40 of FIG. 39.
Figure 41:
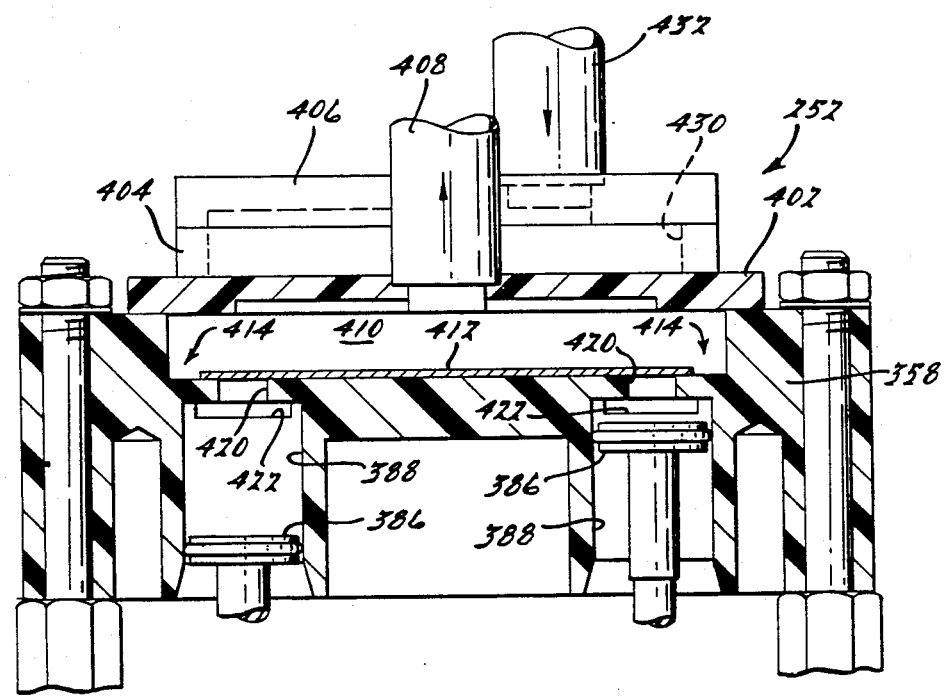
FIG. 41 is a cross-sectional view of the pump taken substantially along the line 41—41 of FIG. 40.

The presently preferred pump is illustrated in FIGS. 39, 41. The presently preferred pump (also seen in FIG. 33) comprises a pump body 358 which is secured with bolts 360 and spacers 362 to a motor 364 and mounting bracket 366 (FIG. 33). The motor is preferably a 1550 rpm 1/40 horsepower shaded pole motor operating at 115 volts, 60 Hz but not limited to this voltage or frequency. Attached to the motor drive shaft is a plastic cylindrical drive coupling 368 which has an end surface 370 which lies in a plane nonorthogonal to the longitudinal axis of the motor drive shaft. The plane is preferably inclined about 11.5 degrees from orthogonal relative to the drive shaft axis. It has been found that inclines between 10 and 15 degrees gives suitable results.

A toggle bar 372 rides upon end surface 370 and translates the rotating movement of the drive coupling into a reciprocating movement. The toggle bar 372 is preferably fabricated with ball extensions 376 attached at each end. The toggle bar is carried on a shaft 378 and held in place with thrust washers 380 and locking ring 381. Toggle bar 372 is suitably coupled with ball extensions 376 to a pair of piston rods 382 to which the piston assemblies 384 are attached. The piston assemblies include self-lubricating O-ring seals 386. The piston assemblies reciprocate within cylinders 388 in the pump housing 358. The presently preferred piston reciprocates in a cylinder of 7/16ths inches in diameter with a stroke of approximately 350/1000 inches. The stroke is of course a function of the angle of incline of the end surface 370 which can be readily changed to change the flow rate by changing to a different angle of incline.

In operation the geometries are such that the pistons tend to move in a figure eight trajectory within cylinders 388. To limit this trajectory and restrict it to a more desired linear reciprocation, guides 390 may be incorporated into the pump structure on both sides of the piston rods to restrict the lateral movement of the piston rods 382 while permitting the longitudinal reciprocating movement thereof. Only the rear guides are shown in FIG. 39 so that the piston rods and ball joints may be better seen. Although the pump drive mechanism is smooth and quiet in operation, the mounting bracket 366 may be provided with suitable resilient motor mounts by which the bracket may be attached to the housing 294 of the plumbing module.

While the two-piston embodiment has given good results, other numbers of pistons could be used. For example, four cylinders spaced 90 degrees apart could be used. Using the preferred geometries and motor operating at 1550 rpm, the presently preferred pump delivers water at a rate of about 0.62 gallons per minute. In the water cooler application a ½ to 1 gallon per minute flow rate would be considered acceptable.

The presently preferred pump assembly is fabricated from self-lubricating plastic components which define a pump housing 358, a cover member 402, a manifold member 404 and a manifold cover 406 but may not be limited to these parts. These components may be disassembled for cleaning or repairs. Attached to the cover member is an outlet port nipple 408 which communicates with an elongated outlet chamber 410 defined by the pump housing 358 and cover member 402 At the base of outlet chamber 410 is a reed valve 412 of silicone-coated stainless steel. Reed valve 412 is elongated to substantially fill the bottom of outlet chamber 410 while providing a clearance space 414 on both ends of the reed. The reed valve 412 is preferably formed with an enlarged or protruding midsection 416 by which the center of the reed valve is stationarily secured by insertion under a tab 418 formed in the pump housing 358. The reed valve is preferably on the order of 0.004 to 0.005 inches thickness of stainless steel with a 0.031 thickness of silicone sheet coating. The reed valve, although held substantially stationary at its midsection, is sufficiently flexible and resilient so that the ends can be repeatedly lifted from the bottom of chamber 410 during each pumping exhaust stroke.

Reed valve 412 covers at each end a port 420 communicating with the cylinders 388. Also communicating with cylinders 388 are ports 422 which communicate with inlet chambers 424. The inlet chambers are defined by pump housing 358 and cover member 402. A second reed valve 426 is positioned at the top of inlet chambers 424 adjacent the underside of cover member 402. Reed valve 426 is similar in construction to reed valve 412 and operates by flexing away from contact with cover member 402 during each pumping intake stroke.

Cover member 402 is provided with apertures 428 which communicates with the inlet chambers 424 and which are covered by reed valve 426. Apertures 428 communicate with intake chamber 430 formed in manifold member 404. Intake chamber 430 is elongated, extending essentially the entire length of manifold 404. An intake port 432 is formed on manifold cover 406 which communicates with intake chamber 430.

In use, the rotation of the motor shaft and coupling 368 causes toggle bar 372 to reciprocate the pistons up and down within the corresponding cylinders. As one piston is effecting an intake stroke, the other piston is effecting an exhaust stroke, both cylinders communicate with common outlet chamber 410 so that the push-/pull action of the two cylinders delivers water through the outlet port 408 at a substantially continuous rate. The intake port delivers water into the inlet chamber 430 within manifold 404 where it is in turn pumped through apertures 428, past reed valve 426 and into the inlet chamber 424 associated with the cylinder currently in its intake down stroke. Each cylinder is provided with its own inlet chamber 424. The inlet chambers are separated by a septum wall 434.

The presently preferred embodiment uses pistons constructed from quad-rings or O-rings which have the advantage of being internally lubricating and which are quite durable in operation. In the alternative. a prestressed Teflon cup can be used in place of the quad-rings.

The presently preferred water delivery system has a minimal number of moving parts which are in contact with the water. All of the parts in contact with the water are plastic or stainless steel and therefore impart no taste to the water. The presently preferred valves, for example, act through the plastic tubing by occluding the tubing without the need for metal valves and valve seats for the water to come in contact with.

Figure 42:
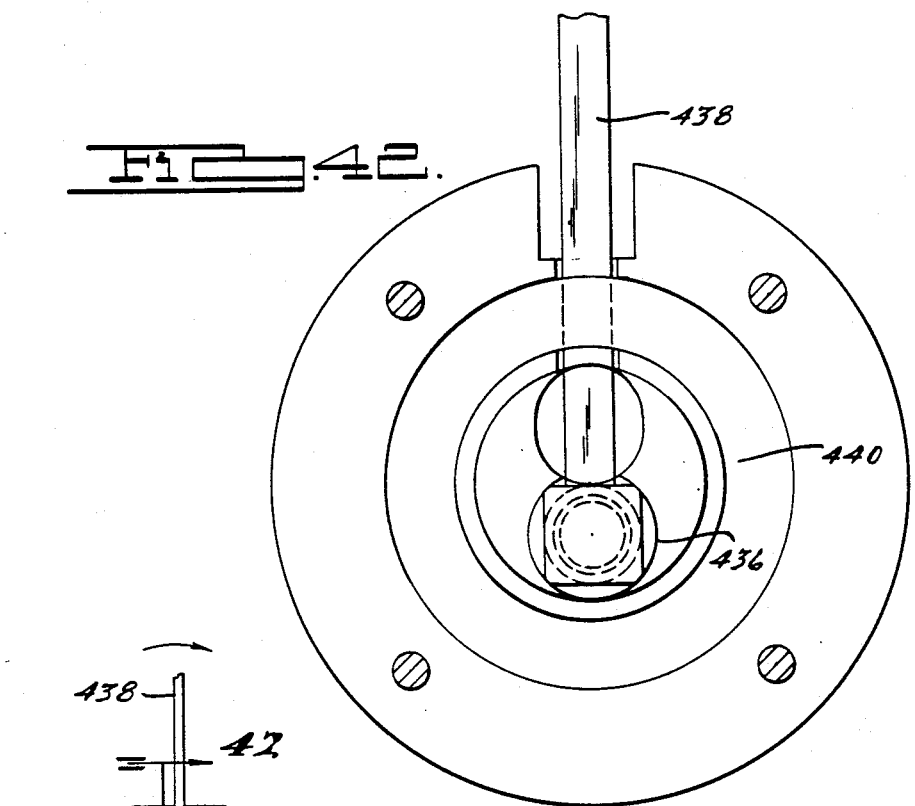
FIGS. 42 and 43 depict an alternate valve configuration, with FIG. 42 being a cross-sectional view taken along the line 42—42 of FIG. 43.
Figure 43:
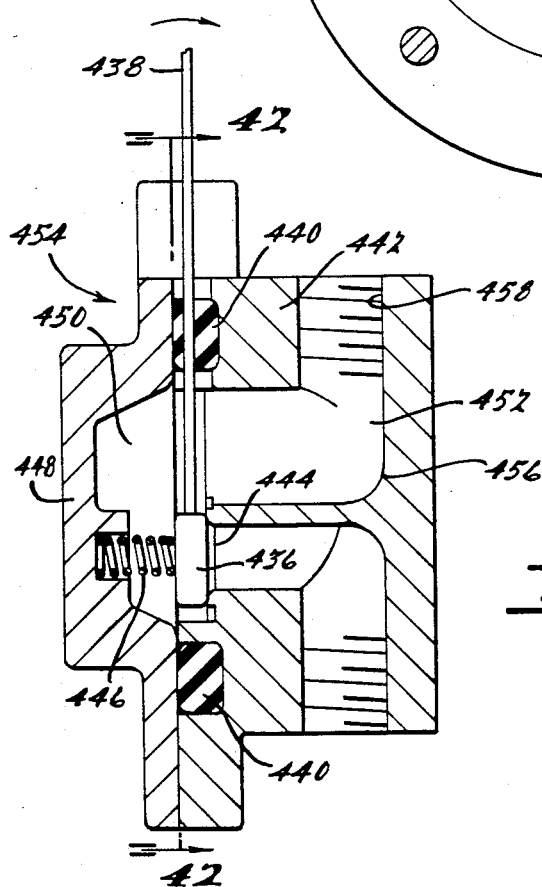

While this type of valving is presently preferred in the bottled water cooler application, other types of valves can be used, particularly where a greater closure force is required. An alternate valve structure is depicted in FIGS. 42 and 43. The alternate valve construction employs a flapper-type mechanism. A valve pad 436 is encapsulated on the end of a steel lever arm 438. The lever arm may be encapsulated with rubber, if desired and is in turn embedded in a rubber O-ring 440. The O-ring is placed in an annular recess in valve body 442 so that valve pad 436 is positioned over the outlet port 444. A bias spring 446 is positioned to bear against pad 436 and is held in place by valve cover 448. The valve cover is formed with a hollow cavity or chamber 450 which couples the inlet port 452 to the outlet port 444. O-ring 440 provides a seal between the valve body and cover to prevent the valve from leaking.

In operation, the lever arm 438 is depressed in the direction of the arrow shown in FIG. 43. The lever arm rocks about the fulcrum point 454 defined at the intersection of the lever arm and O-ring. When the lever arm is depressed in this fashion, valve pad 436 is urged away from its seat against the bias spring force of spring 446. This established communication between inlet port 452 and outlet port 436.

Notably, the inlet port 452 is formed with a water diverting bend 456. In other words, the inlet end portion 458 and the inlet port 452 are disposed along nonparallel axes. This bend in the inlet side of the valve breaks the flow of the in rushing water so that the turbulent shock is absorbed in the bend region of the inlet rather than at the valve seat. This configuration permits a weaker bias spring to be employed without unwanted valve leakage due to the turbulent shock causing unseating of the valve pad.

If desired, the outlet side of the valve may be similarly configured so that the threaded inlet and outlet portions lie along a common axis for easy insertion into a plumbing assembly.

The alternate valve assembly may be used in the bottled water cooler in place of the pinch valve assemblies, if desired. The alternate valve assemblies may also prove useful in drinking fountains of the type intended for connection to a pressurized source of water such as that supplied in a residential or business building.

The plumbing module, although well-suited for the bottled water cooler application described, may also be used for providing hot and chilled water services in built-in installations such as kitchenettes, wet bars, and the like.

While the invention has been described in connection with the presently preferred embodiments, it will be understood that the invention is capable of certain modifications without departing from the spirit of the invention as set forth in the appended claims.

What is claimed is:

1. A valve construction for fluid control systems comprising:
   a valve plate defining a plane and having a first portion defining a first valve seat area extending beyond and on a first side of said plane;
   a lever arm carried on said valve plate for limited rotational movement about a fulcrum axis;
   said lever arm having an actuation portion extending beyond said plane and having a second valve seat area in general registration with said first valve seat area;
   a fluid conducting resiliently deformable tube carried between said lever arm and said valve plate;
   said lever arm being rotatable between a first position relative to said valve plate in which said tube is pinched between and occluded by the coaction of said first and second valve seat areas, and a second position relative to said valve plate in which said tube is not pinched between and occluded by the coaction of said first and second valve seat areas;
   wherein said plate includes first and second slots and wherein said lever arm includes a first mounting tab portion disposed in said first slot, said first slot and said first mounting tab portion defining said fulcrum axis and wherein said actuation portion extends into said second slot;
   wherein said first mounting tab portion has a given external dimension and wherein said first slot includes an enlarged portion of internal dimension sufficient to permit said first mounting tab portion to pass through said first slot; and
   wherein said first mounting tab portion and first slot define means for retaining said first mounting tab portion within said first slot whereby removal of said first mounting tab portion from said first slot is inhibited.

2. The valve construction of claim 1 wherein said lever arm carries said tube.

3. The valve construction of claim 1 wherein said lever arm defines a pair of axially spaced apertures and wherein said tube is positioned through and carried by said apertures.

4. The valve construction of claim 1 wherein said lever arm comprises a plastic material.

5. The valve construction of claim 1 further comprising means for biasing said lever arm in said first position.

6. The valve construction of claim 1 further comprising cage means carried on said valve plate adjacent said lever arm and spring means operatively disposed between said lever arm and said cage means for biasing said lever arm in said first position.

7. The valve construction of claim 6 wherein said cage means comprises a plastic material.

8. The valve construction of claim 1 further comprising mounting bracket means carried by said valve plate and limit switch carried by said bracket means in an orientation such that said lever arm actuates said limit switch in said second position.

9. The valve construction of claim 8 wherein said bracket means comprises a plastic material.

10. The valve of claim 8 further comprising cage means carried on said valve plate adjacent said lever arm and spring means operatively disposed between said lever arm and said cage means for biasing said lever arm in said first position and wherein said bracket means is attached to said cage means.

11. The valve of claim 1 wherein said actuation portion of said lever arm extends on a second side of said plane.

12. The valve of claim 1 wherein said first slot includes a reduced portion of internal dimension less than said external dimension of said first mounting tab portion and wherein said first tab includes an inset means for selectively engaging said reduced portion, said inset means and said reduced portion defining said means for retaining said first mounting tab portion.

* * * * *